United States Patent
Shigetomi

(10) Patent No.: US 9,203,985 B2
(45) Date of Patent: Dec. 1, 2015

(54) FUNCTION SETTING CONTROL SYSTEM AND IMAGE FORMING APPARATUS

(71) Applicant: KYOCERA Document Solutions Inc., Osaka-shi, Osaka (JP)

(72) Inventor: Masayuki Shigetomi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 42 days.

(21) Appl. No.: 14/061,840

(22) Filed: Oct. 24, 2013

(65) Prior Publication Data
US 2014/0118785 A1    May 1, 2014

(30) Foreign Application Priority Data

Oct. 25, 2012    (JP) .................................. 2012-235616

(51) Int. Cl.
*H04N 1/00* (2006.01)
*G06F 3/12* (2006.01)

(52) U.S. Cl.
CPC ......... *H04N 1/00225* (2013.01); *H04N 1/0097* (2013.01); *H04N 1/00413* (2013.01); *H04N 1/00482* (2013.01); *H04N 1/00973* (2013.01); *G06F 3/1205* (2013.01); *G06F 3/1255* (2013.01); *G06F 3/1285* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0005839 A1 | 1/2002 | Nojiri | |
| 2009/0052348 A1* | 2/2009 | Kato et al. | 370/254 |
| 2011/0063645 A1 | 3/2011 | Sugino | |
| 2011/0083105 A1* | 4/2011 | Shin et al. | 715/830 |
| 2011/0181900 A1 | 7/2011 | Suese | |
| 2011/0292445 A1* | 12/2011 | Kato | 358/1.15 |
| 2013/0027746 A1* | 1/2013 | Sasase | 358/1.15 |
| 2014/0022599 A1 | 1/2014 | Sugino | |

FOREIGN PATENT DOCUMENTS

| | | |
|---|---|---|
| JP | 2001-345965 | 12/2001 |
| JP | 2003-167714 | 6/2003 |
| JP | 2003-280864 | 10/2003 |
| JP | 2006-53284 | 2/2006 |
| JP | 2008-92077 | 4/2008 |
| JP | 2008-224977 | 9/2008 |

OTHER PUBLICATIONS

JP-2003167714—translation, Jun. 2003, Japan, Imayoshi et al.*
JP-2008224977—translation, Sep. 2008, Japan, Hashimoto et al.*
JP-2005020101—translation, Hayashi, Jan 20, 2005.*

* cited by examiner

*Primary Examiner* — Fan Zhang
(74) *Attorney, Agent, or Firm* — Gerald E. Hespos; Michael J. Porco; Matthew T. Hespos

(57) ABSTRACT

A function setting control system includes: an image forming apparatus including a control unit, a setting information storage unit, and a function setting information transmitting unit; and a mobile terminal device including a mobile-side display unit, a mobile-side receiving unit, and a display control unit. The setting information storage unit associates a plurality of pieces of setting item information and a plurality of pieces of setting content information with each other and stores the associated information as first function setting information. The function setting information transmitting unit transmits second function setting information including at least a part of the pieces of setting item information included in the first function setting information and corresponding pieces of setting content information. The display control unit associates the setting content information and the setting item information included in the received second function setting information and displays the associated information on one screen.

9 Claims, 24 Drawing Sheets

FIG.6

| SETTING ITEM | INITIAL VALUE |
|---|---|
| NUMBER OF COPIES | 1  L1 |
| PAPER SELECTION | AUTOMATIC  L2 |
| SCALE | 100%  L3 |
| DUPLEX/SPLIT | 1-SIDED→1-SIDED  L4 |
| DARKNESS | NORMAL  L5 |
| N-UP | NOT SET  L6 |
| EJECT TO: | UPPER TRAY  L7 |
| ... | ... |

FIG.7

| SETTING ITEM | INITIAL VALUE |
|---|---|
| NUMBER OF COPIES  J1 | 1  K1 |
| PAPER SELECTION  J2 | AUTOMATIC  K2 |
| SCALE  J3 | 100%  K3 |
| DUPLEX/SPLIT  J4 | 1-SIDED→1-SIDED  K4 |
| DARKNESS  J5 | NORMAL  K5 |
| N-UP  J6 | NOT SET  K6 |
| EJECT TO:  J7 | UPPER TRAY  K7 |

FIRST FUNCTION SETTING INFORMATION F1

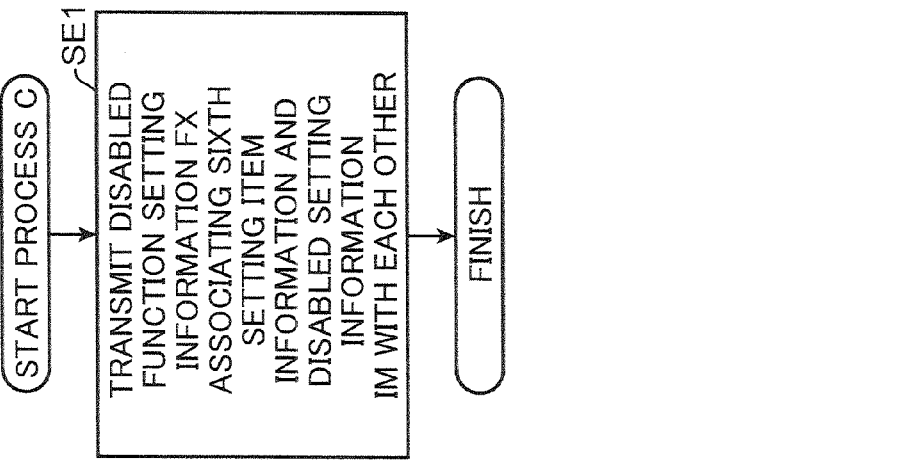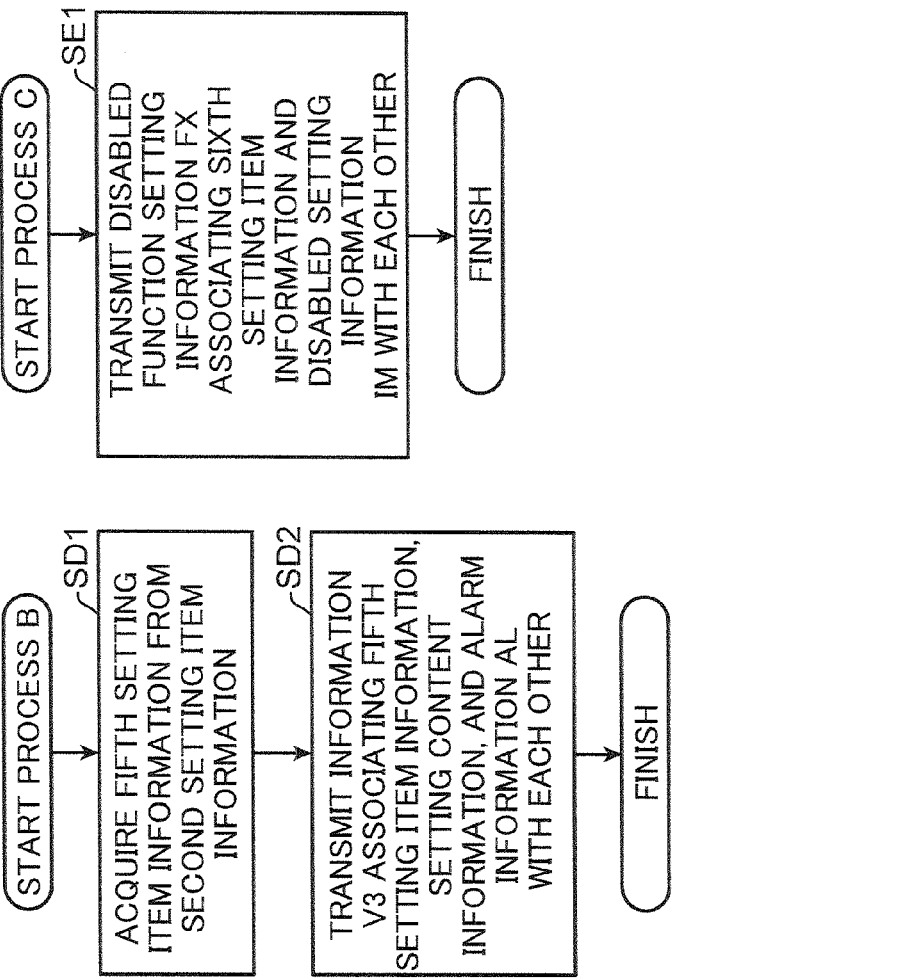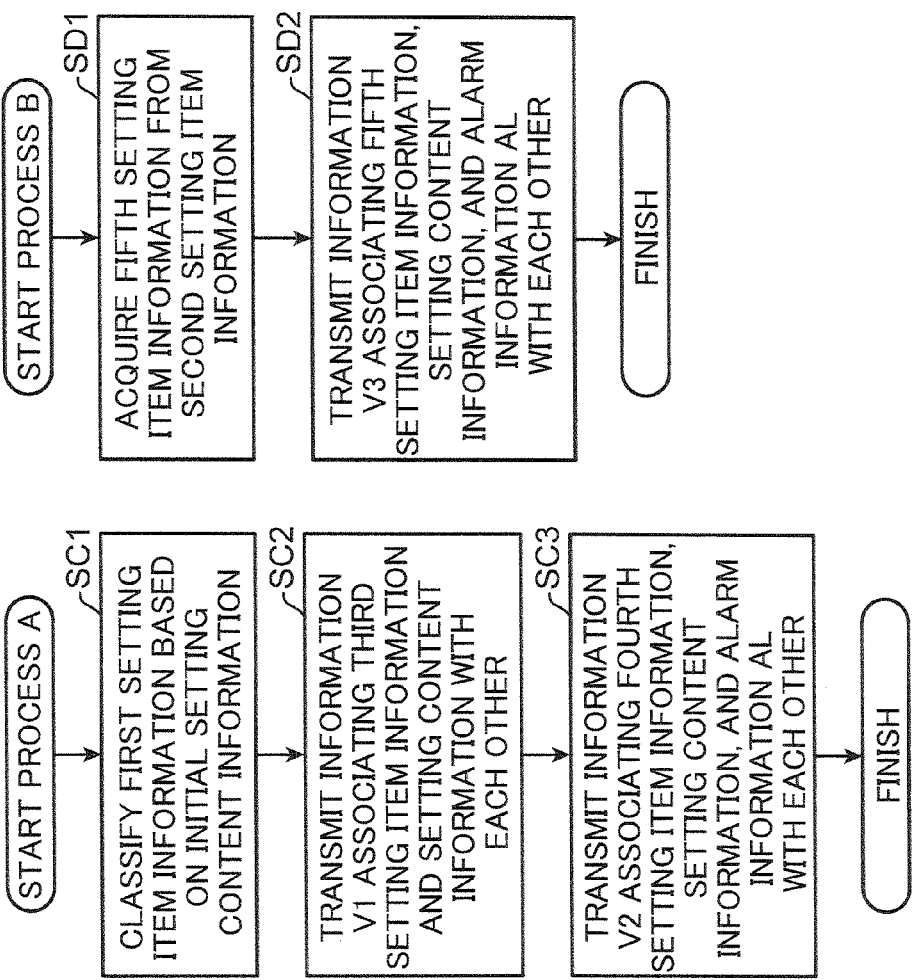

FUNCTION SETTING CONTROL SYSTEM AND IMAGE FORMING APPARATUS

INCORPORATION BY REFERENCE

This application is based on, and claims priority from, Japanese Patent Application No. 2012-235616, filed Oct. 25, 2012 with the Japan Patent Office, the entire contents of which are incorporated herein by reference.

BACKGROUND

The present disclosure relates to a function setting control system including an image forming apparatus and a mobile terminal device capable of communicating with the image forming apparatus, and to the image forming apparatus. In particular, the present disclosure relates to technology for displaying a plurality of setting items for controlling functions and setting contents corresponding to the setting items on a mobile terminal device.

Conventionally, image forming apparatuses referred to as multifunction machines are known which are capable of executing a plurality of functions including a copier function, a scanner function, and a facsimile function. Some known image forming apparatuses are equipped with a function to communicate with a mobile terminal device such as a smartphone.

For example, a mobile terminal is known which receives, from a multifunction machine connected so as to be capable of communication, a list of functions executable by the multifunction machine and which displays a user interface screen used to input attribute information corresponding to the respective functions. The mobile terminal transmits each function inputted by an operation performed on the user interface screen and attribute information that corresponds to the function to the multifunction machine. The multifunction machine receives each function and attribute information that corresponds to the function which are transmitted from the mobile terminal. In addition, the multifunction machine executes each function based on each received function and attribute information that corresponds to the function.

In addition, for example, an image forming apparatus is known which is provided with hierarchically-developing setting input screens used to input various conditions for forming an image such as the number of copies to be printed and darkness. The image forming apparatus includes a setting confirmation screen that displays a list of conditions inputted using each setting input screen and values of the conditions. By pressing a setting confirmation key on an operation panel, a transition can be made from each setting input screen to the setting confirmation screen.

With the mobile terminal and the multifunction machine described above, at the mobile terminal, a user can input setting contents that respectively correspond to a plurality of setting items for controlling functions. However, confirming inputted setting contents requires that a complicated operation be performed involving redisplaying, for each setting content, an operation screen for inputting the setting content. In addition, at the image forming apparatus, in order to confirm an already-inputted setting content when a plurality of setting contents are being inputted, the user must stop displaying an operation screen for inputting the setting content and switch to displaying a screen that displays a list of the setting contents. In other words, a complicated operation involving switching between screen displays must be performed.

An object of the present disclosure is to enable a user to readily confirm setting contents corresponding to a plurality of setting items for controlling functions in a function setting control system which includes an image forming apparatus and a mobile terminal device capable of communicating with the image forming apparatus.

SUMMARY

A function setting control system according to the present disclosure includes an image forming apparatus and a mobile terminal device capable of communicating with the image forming apparatus. The image forming apparatus includes a control unit, a setting information storage unit, and a function setting information transmitting unit. The control unit controls functions by using a plurality of setting items. The setting information storage unit respectively associates a plurality of pieces of setting item information respectively representing the plurality of setting items and a plurality of pieces of setting content information representing setting contents that respectively correspond to the plurality of setting items with each other and stores the associated information as first function setting information. The function setting information transmitting unit executes a function setting information transmission process in which second function setting information including at least a part of the pieces of setting item information among the plurality of pieces of setting item information included in the first function setting information and the setting content information corresponding to the at least part of the pieces of setting item information is transmitted to the mobile terminal device. The mobile terminal device includes a mobile-side display unit which displays information, a mobile-side receiving unit which receives information transmitted from the image forming apparatus, and a display control unit. The display control unit performs a list display process of causing the mobile-side display unit to display a list display screen on which, based on the second function setting information received by the mobile-side receiving unit, setting item information included in the second function setting information and the setting content information associated with the setting item information included in the second function setting information are associated with each other and displayed on one screen.

BRIEF DESCRIPTION OF THE DRAWINGS

FIG. 6 is an explanatory diagram showing an example of a plurality of pieces of initial setting content information stored in an initial setting information storage unit;

FIG. 7 is an explanatory diagram showing an example of first function setting information stored in a setting information storage unit;

FIG. 15A is a flow chart showing a process A that is executed in an operation performed by a multifunction machine to transmit function setting information to a mobile terminal device, FIG. 15B is a flow chart showing a process B that is executed in an operation performed by a multifunction machine to transmit function setting information to a mobile terminal device, and FIG. 15C is a flow chart showing a process C that is executed in an operation performed by a multifunction machine to transmit function setting information to a mobile terminal device;

DETAILED DESCRIPTION

Figure 1:
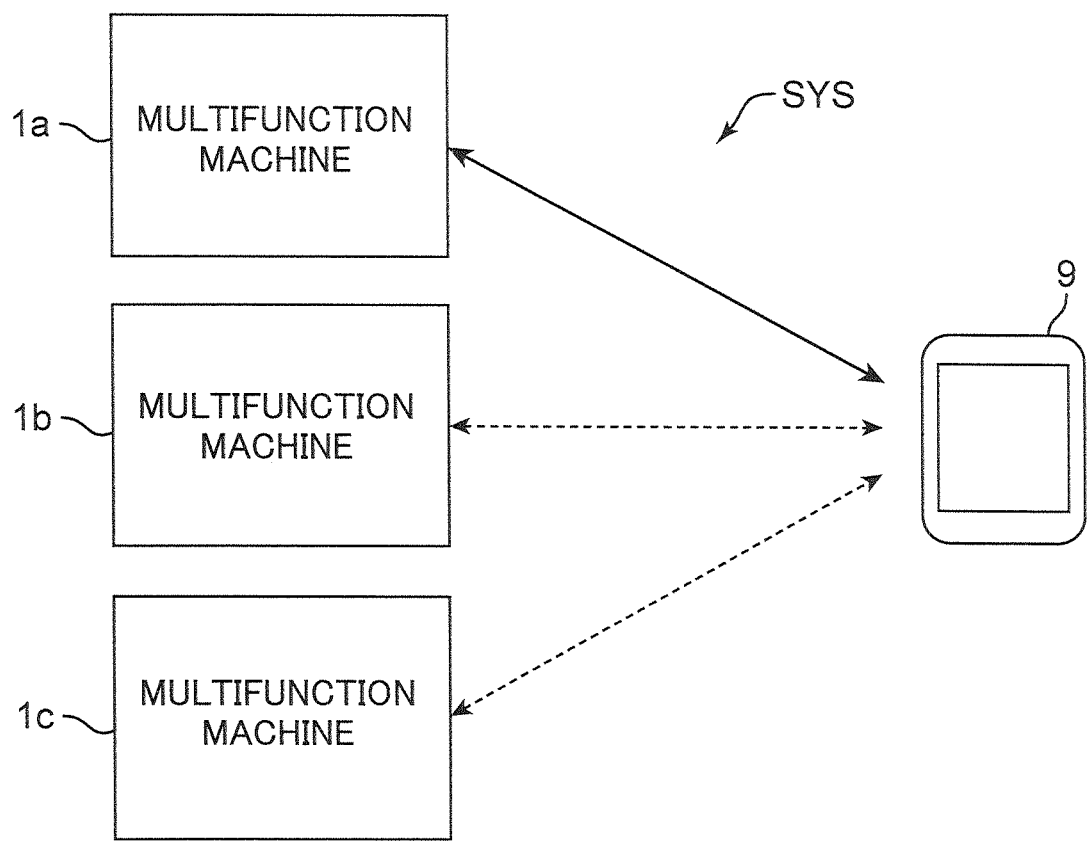
FIG. 1 is an explanatory diagram showing a configuration of a function setting control system according to an embodiment of a function setting control system according to the present disclosure.

Hereinafter, an embodiment of the present disclosure will be described with reference to the drawings. FIG. 1 is an explanatory diagram showing a configuration of a function setting control system SYS according to an embodiment of a function setting control system according to the present disclosure.

As shown in FIG. 1, the function setting control system SYS includes a plurality of multifunction machines 1a to 1c as an example of the image forming apparatus according to the present disclosure and a mobile terminal device 9. The multifunction machines 1a to 1c are capable of executing a wide variety of functions such as a copier function, a scanner function, and a facsimile function. The mobile terminal device 9 is, for example, a smartphone or a tablet terminal. The multifunction machines 1a to 1c and the mobile terminal device 9 are mutually capable of performing radio communication such as Bluetooth (registered trademark) or infrared communication. The mobile terminal device 9 alternatively selects one communication object multifunction machine among the plurality of multifunction machines 1a to 1c. The mobile terminal device 9 performs radio communication with the selected multifunction machine 1a, 1b, or 1c. For example, a solid line arrow in FIG. 1 depicts radio communication being performed between the multifunction machine 1a and the mobile terminal device 9. Moreover, the number of multifunction machines included in the function setting control system SYS is not limited to three. For example, the function setting control system SYS may include one multifunction machine.

Figure 2:
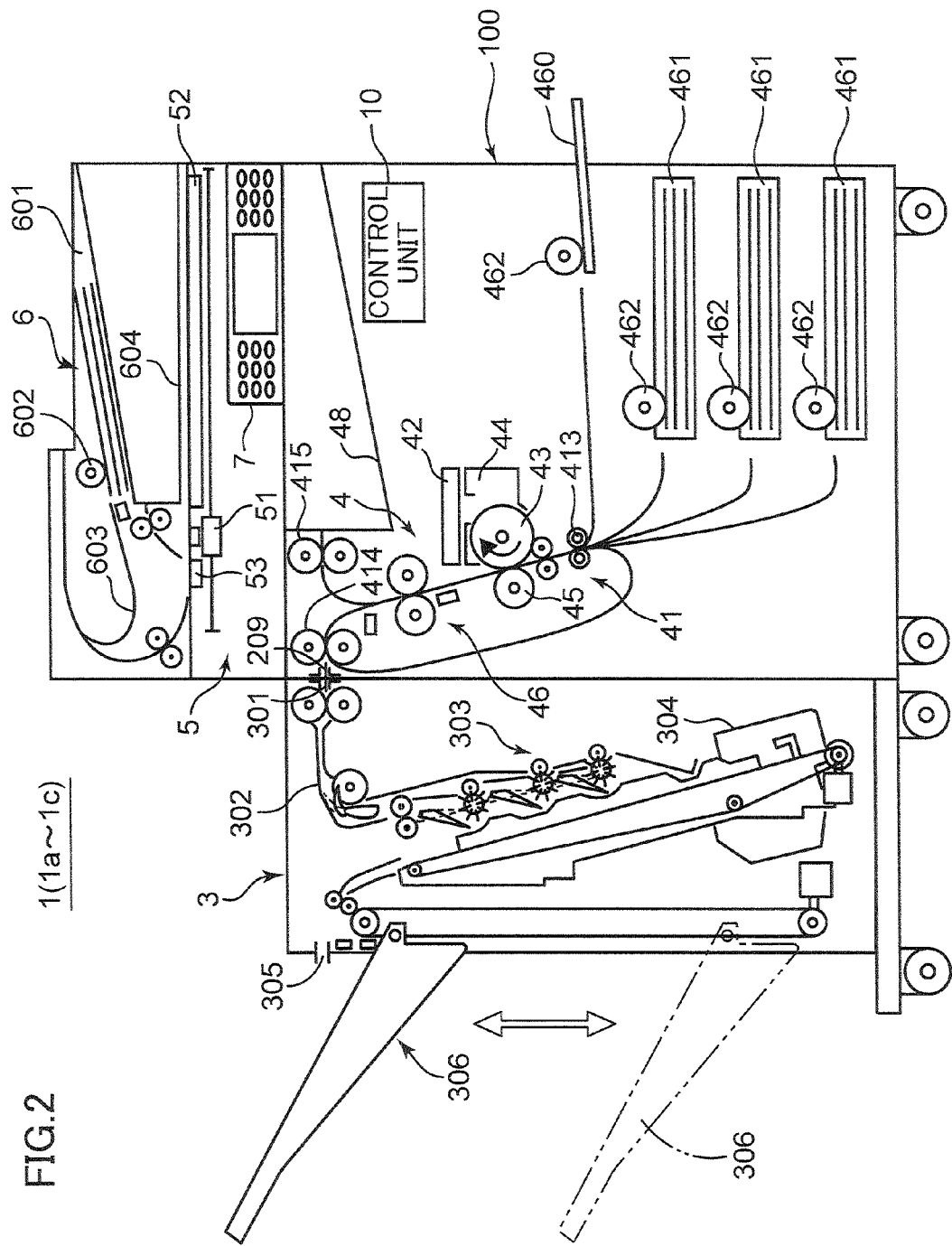
FIG. 2 is a schematic structural diagram of an image forming apparatus according to an embodiment of an image forming apparatus according to the present disclosure.

FIG. 2 is a schematic structural diagram of the multifunction machines 1a to 1c according to an embodiment of an image forming apparatus according to the present disclosure. Since the multifunction machines 1a to 1c share a similar configuration, hereinafter, the multifunction machines 1a to 1c will be collectively referred to as a multifunction machine 1.

The multifunction machine 1 includes a document reading unit 5, a document feeding unit 6, a body portion 100, a post-processing unit 3, and an operating unit 7.

The document reading unit 5 includes a scanner 51 constituted by a charge coupled device (CCD), an exposure lamp, and the like, a document table 52 constructed by a transparent member such as glass, and a document reading slit 53. The scanner 51 is configured to be movable by a drive unit (not shown). When reading a document placed on the document table 52, the scanner 51 moves along a document surface at a position facing the document table 52 and outputs image data acquired while scanning an document image to a control unit 10. In addition, when reading a document fed by the document feeding unit 6, the scanner 51 moves to a position facing the document reading slit 53. Subsequently, the scanner 51 acquires an image of the document in synchronization with a document conveying operation performed by the document feeding unit 6 via the document reading slit 53, and outputs acquired image data to the control unit 10.

The document feeding unit 6 includes a document mounting unit 601, a paper feeding roller 602, a document conveying unit 603, and a document ejecting unit 604. The paper feeding roller 602 reels out a predetermined number of pages of the document set on the document mounting unit 601 one sheet at a time. The document conveying unit 603 sequentially conveys the reeled-out document to a reading position of the scanner 51. The scanner 51 sequentially reads images of the conveyed document. The read document is ejected to the document ejecting unit 604 by the document feeding unit 6.

In addition, a front side of the document feeding unit 6 is provided so as to be rotatable upward with respect to the body portion 100. By moving the front side of the document feeding unit 6 upward and opening an upper surface of the document table 52, an operator can place a document to be read such as a double-page spread book on the upper surface of the document table 52.

The body portion 100 includes a manual feed tray 460, a plurality of paper cassettes 461, a plurality of paper feeding rollers 462, an image forming unit 4, an ejection port 209, an ejection tray 48, and a control unit 10.

The paper feeding roller 462 extracts a sheet of paper from the manual feed tray 460 and a paper cassette 461 which house sheets of paper, and feeds the sheet of paper to the image forming unit 4.

The image forming unit 4 includes a paper conveying unit 41, an optical scanning device 42, a photoreceptor drum 43, a developing unit 44, a transfer unit 45, and a fixing unit 46.

The paper conveying unit 41 includes conveying rollers 413, 414, and 415. The conveying roller 413 feeds the sheet of paper conveyed by the paper feeding roller 462 to the photoreceptor drum 43. The conveying roller 414 conveys the sheet of paper to the post-processing unit 3 via the ejection port 209. The conveying roller 415 conveys the sheet of paper to the ejection tray 48.

The optical scanning device 42 outputs a laser beam based on image data inputted to the control unit 10. The optical scanning device 42 scans the photoreceptor drum 43 using the laser beam. Accordingly, an electrostatic latent image is formed on the photoreceptor drum 43.

The developing unit 44 applies a toner to the electrostatic latent image on the photoreceptor drum 43 to form a toner image. The transfer unit 45 transfers the toner image on the photoreceptor drum 43 onto a sheet of paper. The fixing unit 46 heats the sheet of paper to which the toner image has been transferred and fixes the toner image onto the sheet of paper.

The control unit 10 controls operations of the entire multifunction machine 1 by controlling operations of respective functional operating units such as the document reading unit 5 and the image forming unit 4. For example, the control unit 10 includes a central processing unit (CPU) which executes predetermined arithmetic processing, a non-volatile memory which stores a predetermined control program such as an electrically erasable and programmable read only memory (EEPROM), a random access memory (RAM) which temporarily stores data, and peripheral circuitry thereof.

The post-processing unit 3 includes a conveying inlet 301, a paper conveying unit 302, a sorting unit 303, a paper processing unit 304, a conveying outlet 305, and a stack tray 306. The post-processing unit 3 is attachable to and detachable from the body portion 100. Sheets of paper requiring post-processing such as stapling and punching after printing are conveyed from the ejection port 209 of the body portion 100 to the conveying inlet 301. The sheets of paper are sequentially conveyed to the sorting unit 303 from the paper conveying unit 302. After the sheets of paper are subjected to sorting and edge alignment as appropriate, processes such as stapling and punching are performed by the paper processing unit 304 and the processed sheets of paper are ejected from the conveying outlet 305 to the stack tray 306. Depending on the number of accumulated sheets of paper ejected from the conveying outlet 305, the stack tray 306 is movable upward and downward (in directions of a white arrow shown in FIG. 2).

Figure 3:
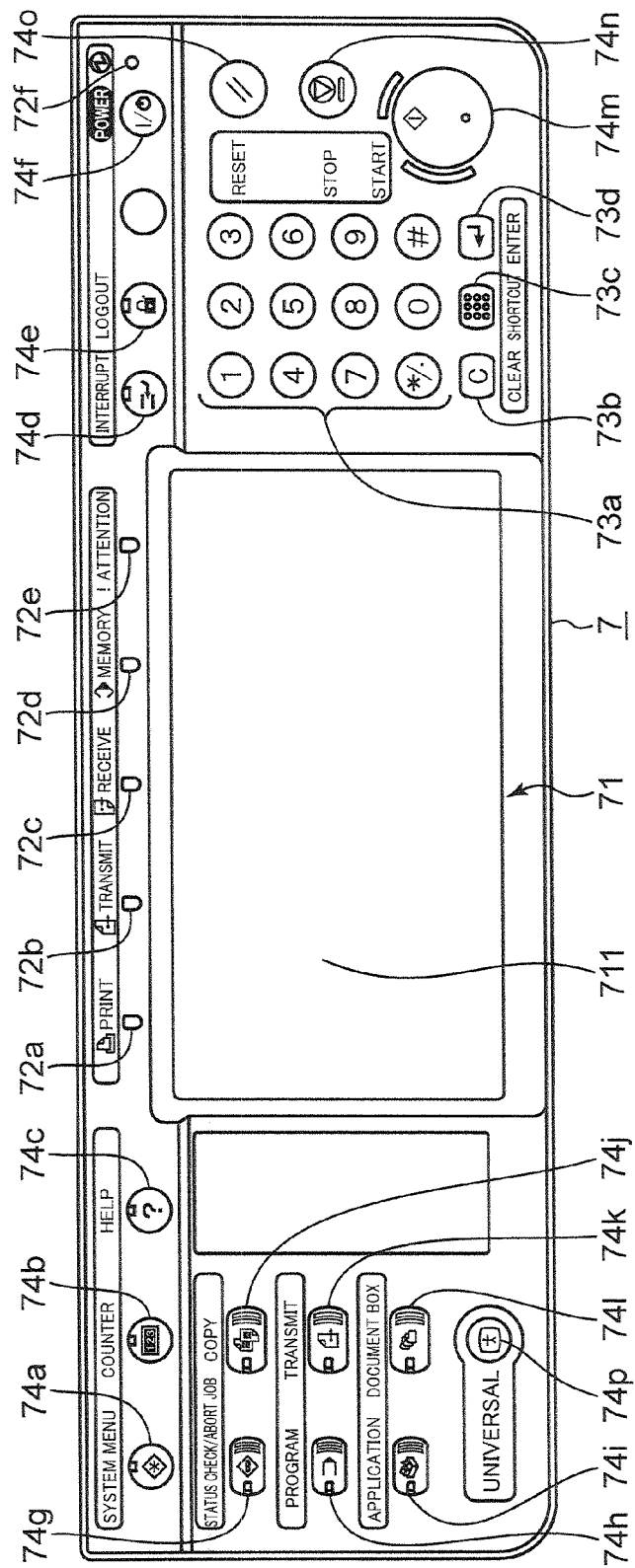
FIG. 3 is an explanatory diagram showing an example of an operating unit.

The operating unit 7 is provided in a front part of the multifunction machine 1 and is configured to allow a user to input various operation instructions. FIG. 3 is an explanatory diagram showing an example of the operating unit 7. As shown in FIG. 3, the operating unit 7 is provided with a touch panel device 71, indicators 72*a* to 72*f*, input keys 73*a* to 73*d*, and switches 74*a* to 74*p*.

The touch panel device 71 includes a liquid crystal display (display unit) 711 equipped with a touch panel function. Due to the touch panel function, when a software key displayed on the liquid crystal display 711 is touched by the user, the touch panel device 71 accepts an instruction that corresponds to the touch operation of the software key. In addition, due to the touch panel function, the touch panel device 71 recognizes a trajectory of a position being touched by the user on the liquid crystal display 711. Based on the recognized trajectory, the touch panel device 71 accepts an instruction that corresponds to a gesture operation that is a predetermined operation.

For example, instructions corresponding to gesture operations such as a tapping operation, a double-tapping operation, a pinching operation, a swiping operation, and a flicking operation are inputted to the touch panel device 71. A tapping operation is an operation involving gently tapping the liquid crystal display 711. A double-tapping operation is an operation involving performing two tapping operations within a predetermined acceptance time. A pinching operation is an operation involving pinching the liquid crystal display 711 with two fingers or spreading the two fingers from a pinched state. A swiping operation is an operation involving sliding a finger while keeping the finger in contact with the liquid crystal display 711. A flicking operation is an operation involving moving a finger as though to gently flick the liquid crystal display 711.

The indicators 72*a* to 72*f* are made of light-emitting diodes and the like. The indicators 72*a* to 72*f* indicate a state of the multifunction machine 1 by blinking or by being turned on/off. For example, the indicator 72*a* blinks when printing is in progress. The indicator 72*b* blinks when data is being transmitted to the outside. The indicator 72*c* blinks when data is being received from the outside. The indicator 72*d* blinks when data stored in a hard disk, a memory, or the like provided in the multifunction machine 1 is being accessed. The indicator 72*e* turns on or blinks when a failure occurs. The indicator 72*f* turns on when power is being supplied to the multifunction machine 1.

The input key 73*a* to 73*d* are provided for inputting numerals and symbols, and deleting or finalizing a character string that has already been inputted. For example, the input key 73*a* is a so-called numerical key group provided for inputting numerals and symbols. The input key 73*b* is a so-called clear key provided for deleting a character string that has already been inputted. The input key 73*c* is a so-called shortcut key provided to read out and input a character string that has been stored in advance in a memory or the like. The input key 73*d* is a so-called enter key (return key) provided to finalize an input instruction of a character string, a selection instruction of a software key, and the like.

The switches 74*a* to 74*p* are switches provided to switch among functions that are execution objects and to start and stop operations of a function among the plurality of functions with which the multifunction machine 1 is equipped.

As a representative example, the switch 74*a* is a switch for switching a function that is an execution object to a system menu function. When the switch 74*a* is pressed, an operation screen for the system menu function is displayed on the liquid crystal display 711. On the operation screen, input operations of initial values of setting contents that respectively correspond to a plurality of setting items for controlling the respective functions can be performed. The switch 74*j* is a switch for switching a function that is an execution object to a copier function. When the switch 74*j* is pressed, an operation screen for the copier function is displayed on the liquid crystal display 711. On the operation screen, input operations of setting contents that respectively correspond to a plurality of setting items for controlling the copier function can be performed. The switch 74*m* is a start switch for starting an operation of a function. The switch 74*n* is a stop switch for stopping an operation of a function. The switch 74*o* is a reset switch for resetting each setting content to an initial value.

Figure 4:
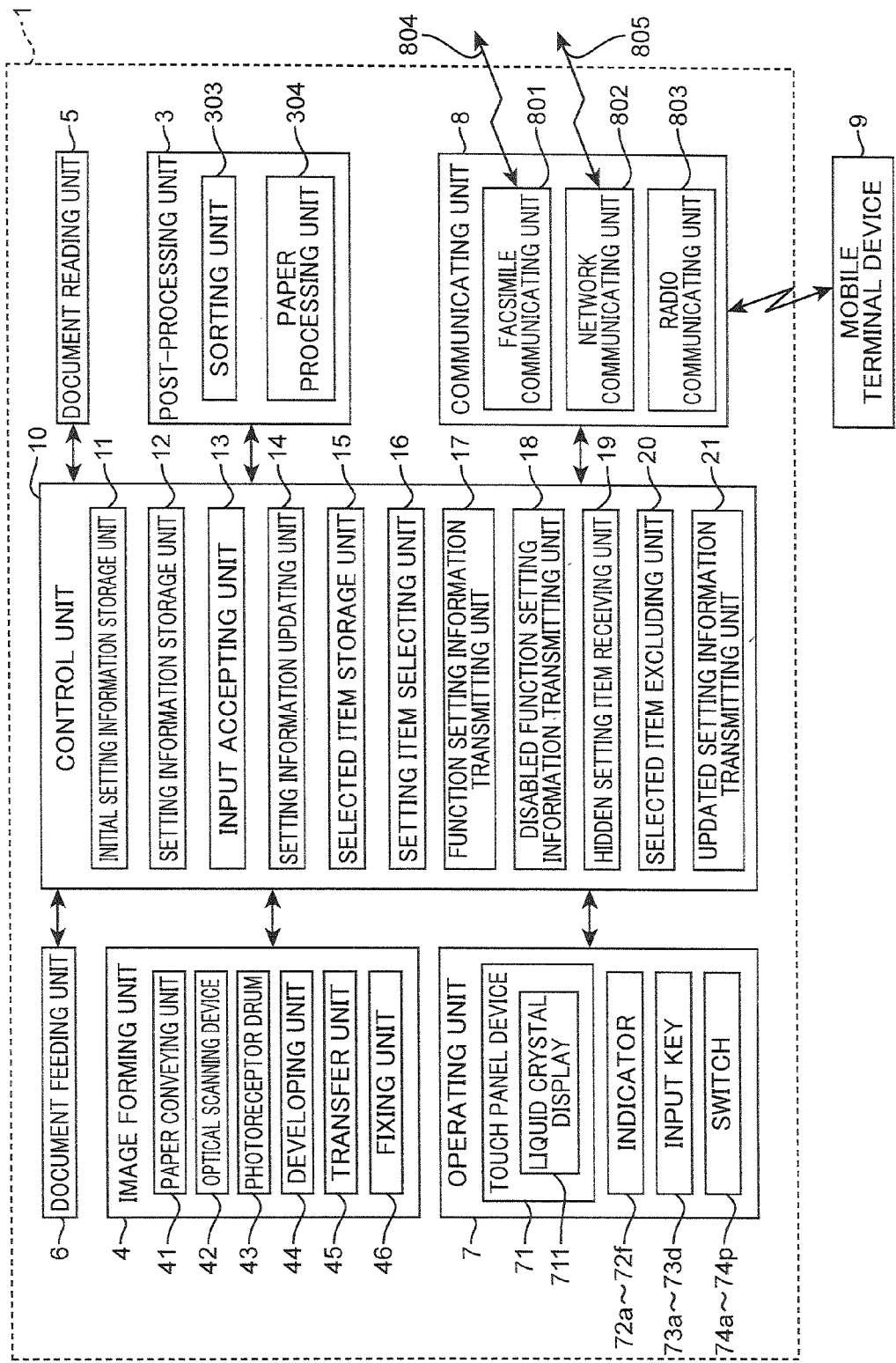
FIG. 4 is a block diagram showing an electrical configuration of a multifunction machine.
Figure 5:
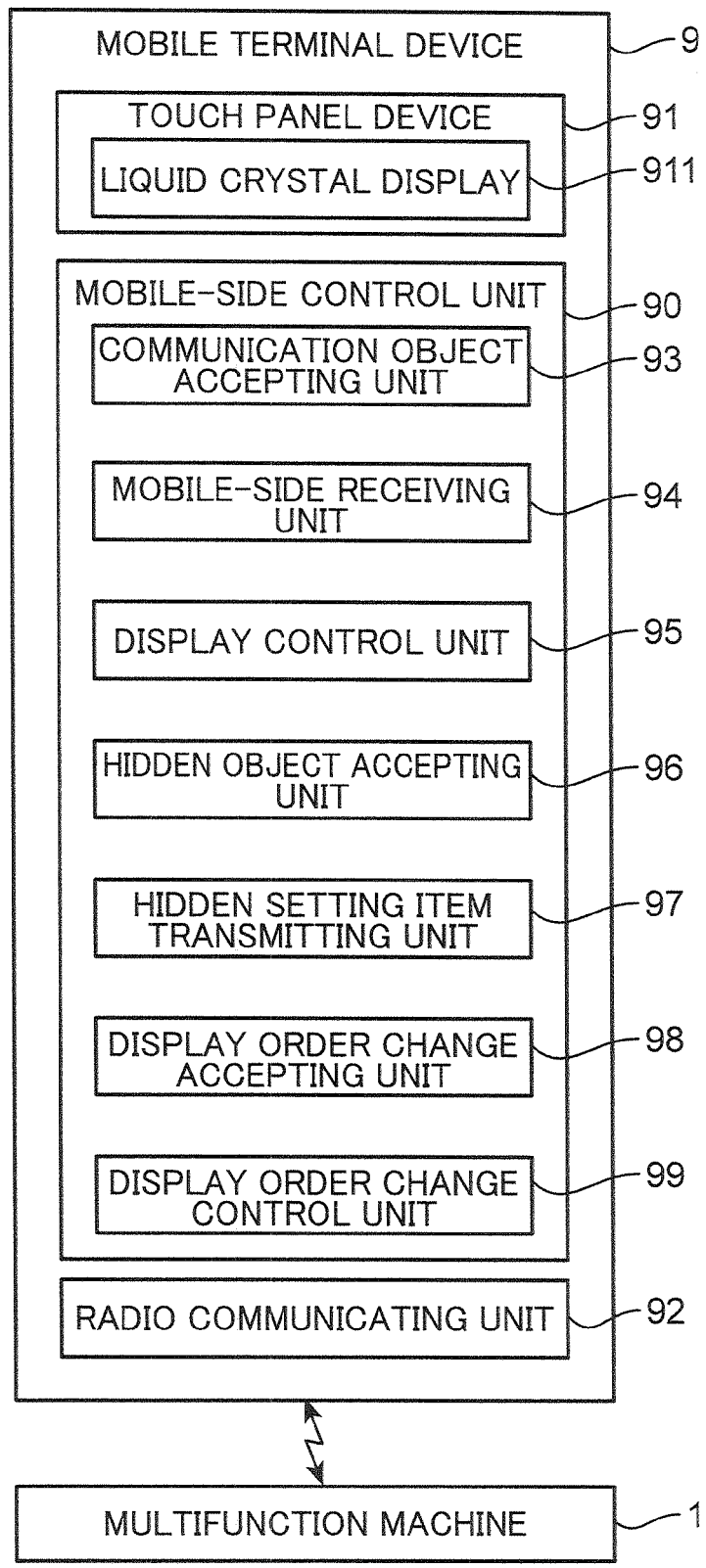
FIG. 5 is a block diagram showing an electrical configuration of a mobile terminal device according to an embodiment of a mobile terminal device according to the present disclosure.

Next, an electrical configuration of the multifunction machine 1 and the mobile terminal device 9 will be described. FIG. 4 is a block diagram showing an electrical configuration of the multifunction machine 1. FIG. 5 is a block diagram showing an electrical configuration of the mobile terminal device 9 according to an embodiment of a mobile terminal device according to the present disclosure.

As shown in FIG. 4, in the multifunction machine 1, the document feeding unit 6, the image forming unit 4, the operating unit 7, the document reading unit 5, the post-processing unit 3, the communicating unit 8, and the control unit 10 are connected so as to be capable of communicating with each other. Since the document feeding unit 6, the image forming unit 4, the operating unit 7, the document reading unit 5, and the post-processing unit 3 have already been described, a description thereof will be omitted.

The communicating unit 8 includes a facsimile communicating unit 801, a network communicating unit 802, and a radio communicating unit 803.

The facsimile communicating unit 801 is connected to a telephone line network 804. The facsimile communicating unit 801 includes an network control unit (NCU) which controls telephone line connection to a destination facsimile and a modulation-demodulation circuit which modulates and demodulates image signals for facsimile communication.

The network communicating unit 802 is connected to a network 805 that is a local area network (LAN), the Internet, or the like. The network communicating unit 802 is a communication interface circuit for executing communication of various types of data with a terminal device such as a personal computer which is connected to the network 805. Various types of data include binary data or the like that represent a character string, an image, or the like that is a print object.

The radio communicating unit 803 is an interface circuit for performing radio communication of various types of data with the mobile terminal device 9 via Bluetooth (registered trademark), infrared communication, or the like. Various types of data include binary data and the like which represents setting information of the respective functions set in the multifunction machine 1. The radio communicating unit 803 constantly stands by for a transmission request of various types of data from the mobile terminal device 9, and transmits the requested various types of data to the mobile terminal device 9 in response to a transmission request from the mobile terminal device 9.

The control unit 10 uses a part of a storage area of the RAM as a setting information storage unit 12 and a part of a storage area of the non-volatile memory as an initial setting information storage unit 11 and a selected item storage unit 15. In addition, by executing the control program stored in the non-volatile memory, the control unit 10 controls operations of the respective functional operating units such as the document reading unit 5 and the image forming unit 4. In particular, the control unit 10 functions as an input accepting unit 13, a setting information updating unit 14, a setting item selecting unit 16, a function setting information transmitting unit 17, a disabled function setting information transmitting unit 18, a hidden setting item receiving unit 19, a selected item excluding unit 20, and an updated setting information transmitting unit 21.

The initial setting information storage unit 11 stores a plurality of pieces of initial setting content information. Initial setting content information is information determined in advance as an initial value of a setting content that corresponds to each setting item for controlling a function that is executable by the multifunction machine 1. For example, setting content information inputted as an initial value of each setting content when the system menu function is executed by the user is stored as each piece of initial setting content information in the initial setting information storage unit 11.

FIG. 6 is an explanatory diagram showing an example of a plurality of pieces of initial setting content information stored in the initial setting information storage unit 11. For example, as shown in FIG. 6, initial setting content information L1 representing "1" is stored in the initial setting information storage unit 11 as an initial value of a setting content that corresponds to a setting item named "number of copies".

In addition, the initial setting information storage unit 11 also stores initial setting content information L2 representing "automatic" as an initial value of a setting content that corresponds to a setting item named "paper selection", initial setting content information L3 representing "100%" as an initial value of a setting content that corresponds to a setting item named "scale", and initial setting content information L4 representing "1-sided→1-sided" as an initial value of a setting content that corresponds to a setting item named "duplex/split". Furthermore, the initial setting information storage unit 11 stores initial setting content information L5 representing "normal" as an initial value of a setting content that corresponds to a setting item named "darkness", initial setting content information L6 representing "not set" as an initial value of a setting content that corresponds to a setting item named "N-up", and initial setting content information L7 representing "upper tray" as an initial value of a setting content that corresponds to a setting item named "eject to".

In the setting information storage unit 12, information respectively associating a plurality of pieces of setting item information respectively representing a plurality of setting items and a plurality of pieces of setting content information representing setting contents that respectively correspond to the plurality of setting items with each other is stored as first function setting information F1. The control unit 10 reads out setting contents which are included in the first function setting information F1 and which respectively correspond to the plurality of setting items for controlling a function that is an operation object and controls operation of the function.

For example, an initialization process is performed by the control unit 10 when power is supplied to the multifunction machine 1, when the switch 74*o* (FIG. 3) is pressed, and the like. In the initialization process, respective pieces of initial setting content information stored in the initial setting information storage unit 11 are read. Subsequently, each piece of read initial setting content information and setting item information representing a setting item that corresponds to each piece of read initial setting content information are associated with each other and stored in the setting information storage unit 12 as first function setting information F1.

FIG. 7 is an explanatory diagram showing an example of the first function setting information F1 stored in the setting information storage unit 12. For example, as shown in FIG. 7, due to the initialization process described above, information which associates setting item information J1 representing the setting item "number of copies" and setting content information K1 representing a setting content of "1" that corresponds to the setting item "number of copies" with each other is stored as the first function setting information F1 in the setting information storage unit 12.

In a similar manner, the setting information storage unit 12 stores information which associates setting item information J2 representing the setting item "paper selection" and setting content information K2 representing a setting content of "automatic" that corresponds to the setting item "paper selection" with each other, information which associates setting item information J3 representing the setting item "scale" and setting content information K3 representing a setting content of "100%" that corresponds to the setting item "scale" with each other, and information which associates setting item information J4 representing the setting item "duplex/split" and setting content information K4 representing a setting content of "1-sided→1-sided" that corresponds to the setting item "duplex/split" with each other as the first function setting information F1. Furthermore, the setting information storage unit 12 stores information which associates setting item information J5 representing the setting item "darkness" and setting content information K5 representing a setting content of "normal" that corresponds to the setting item "darkness" with each other, information which associates setting item information J6 representing the setting item "N-up" and setting content information K6 representing a setting content of "not set" that corresponds to the setting item "N-up" with each other, and information which associates setting item information J7 representing the setting item "eject to" and setting content information K7 representing a setting content of "upper tray" that corresponds to the setting item "eject to" with each other as the first function setting information F1.

The input accepting unit 13 accepts an input operation of setting content information that corresponds to any setting item among a plurality of setting items. The setting information updating unit 14 performs a setting information updating process. The setting information updating process is a process in which setting content information that corresponds to any of the setting items accepted by the input accepting unit 13 is stored in the setting information storage unit 12 as new setting content information that corresponds to setting item information representing the any of the setting items stored in the setting information storage unit 12.

Figure 8:
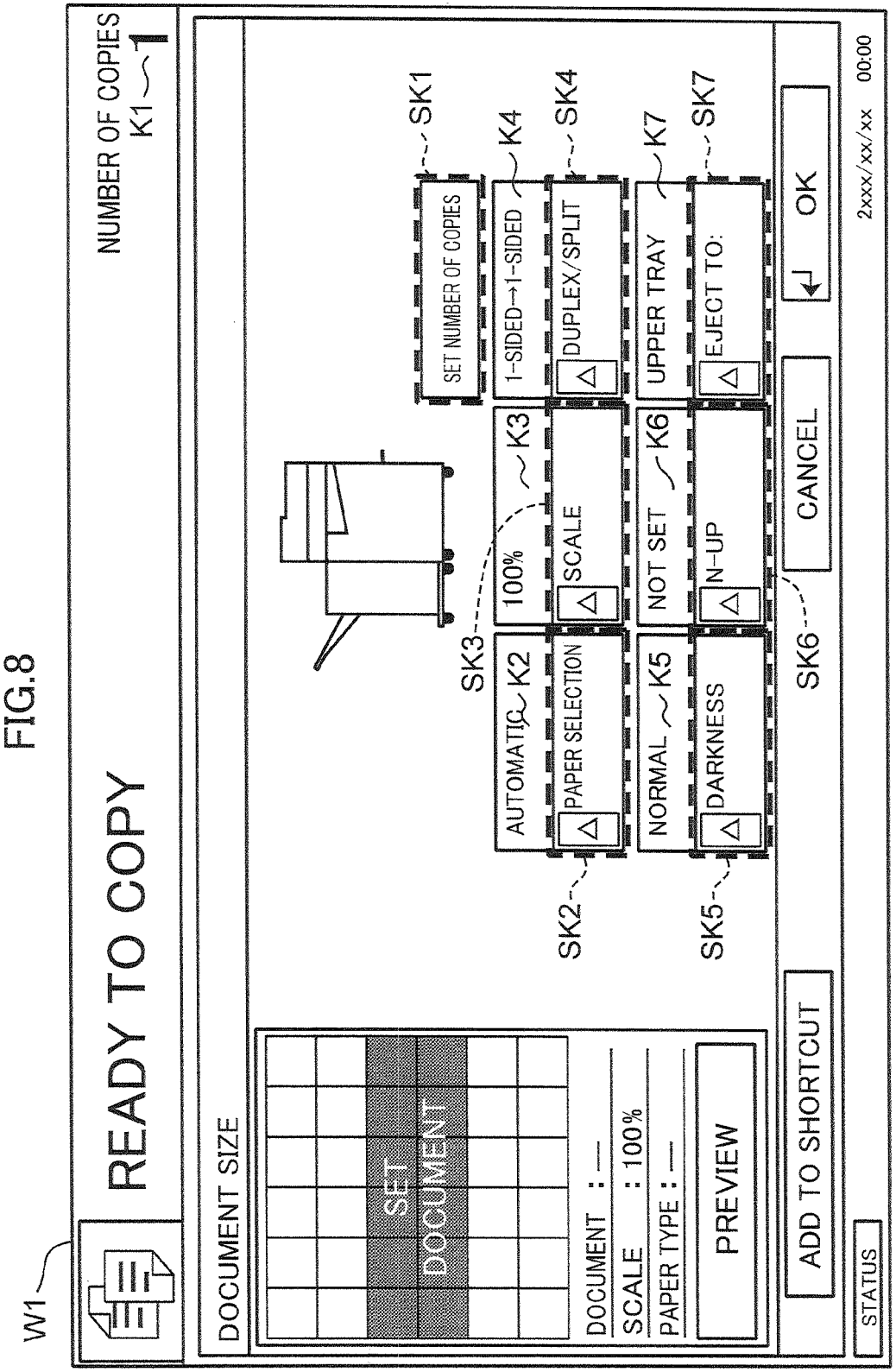
FIG. 8 is an explanatory diagram showing an example of an operation screen for performing an input operation of setting content information that corresponds to a plurality of setting items for controlling a copier function.
Figure 9:
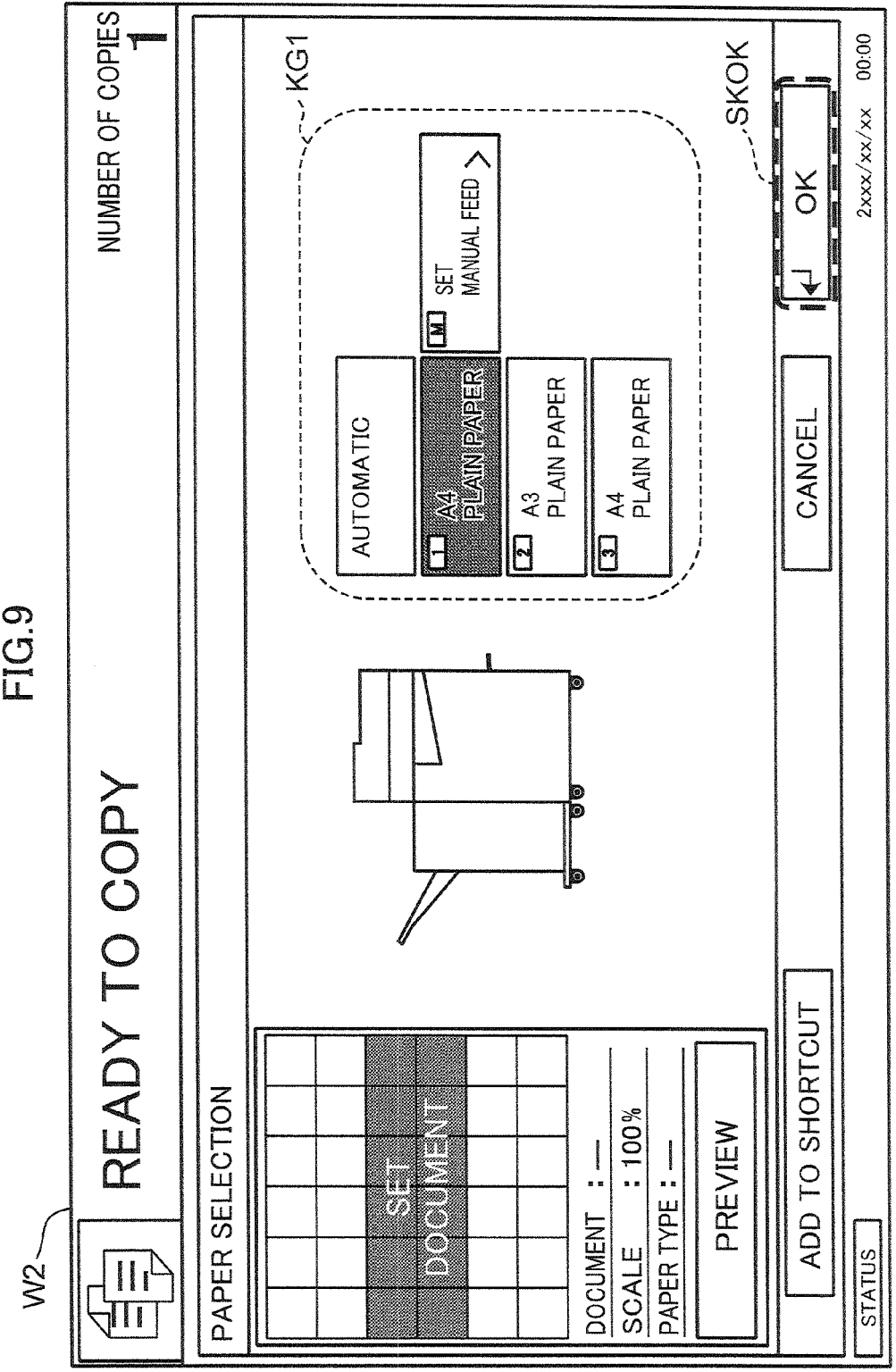
FIG. 9 is an explanatory diagram showing an example of an operation screen for performing an input operation of setting content information that corresponds to a setting item named "paper selection"

FIG. 8 is an explanatory diagram showing an example of an operation screen for performing an input operation of setting content information that corresponds to a plurality of setting items for controlling a copier function. FIG. 9 is an explanatory diagram showing an example of an operation screen for performing an input operation of setting content information that corresponds to the setting item "paper selection". Specifically, when the switch 74j (FIG. 3) is pressed, for example, the input accepting unit 13 causes an operation screen W1 to be displayed on the liquid crystal display 711 as shown in FIG. 8. On the operation screen W1, input operations of setting content information that corresponds to a plurality of setting items for controlling the copier function can be performed.

On the operation screen W1, reference letters SK1 to SK7 respectively denote software keys for causing operations to be performed in order to display, on the liquid crystal display 711, respective operation screens used to perform input operations of setting content information that corresponds to the setting items "number of copies", "paper selection", "scale", "duplex/split", "darkness", "N-up", and "eject to".

Pieces of setting content information K2 to K7 (FIG. 7) associated with the respective setting items stored in the setting information storage unit 12 are displayed in upper parts of the software keys SK2 to SK7 that correspond to the respective setting items. In addition, the setting content information K1 (FIG. 7) associated with the setting item "number of copies" is displayed in a vertically upper part of the operation screen W1. In other words, by pressing the switch 74j (FIG. 3) to perform an operation for switching the display of the liquid crystal display 711 to the operation screen W1, the user can readily confirm setting contents that correspond to the plurality of setting items for controlling the copier function.

For example, let us assume that the software key SK2 is touched by the user on the operation screen W1. In this case, the input accepting unit 13 switches the operation screen W1 displayed on the liquid crystal display 711 to an operation screen W2 for performing an input operation of setting information regarding a paper selection function as shown in FIG. 9. Accordingly, since the operation screen W1 is no longer displayed on the liquid crystal display 711, the user is no longer able to readily confirm setting contents that correspond to the plurality of setting items for controlling the copier function.

On the operation screen W2 shown in FIG. 9, reference letter KG1 denotes a software key group for performing a selection operation of paper placed on the manual feed tray 460 and paper housed in the respective paper cassettes 461. For example, FIG. 9 shows a state where "A4"-sized paper that is housed in the uppermost paper cassette 461 has been selected. Let us assume that an OK key SKOK is pressed in a state where paper has been selected in this manner by a touch operation of any of the software keys among the software key group KG1 by the user. In this case, the input accepting unit 13 accepts information representing "A4" which corresponds to the software key on which a touch operation had been performed by the user as setting content information that corresponds to the setting item "paper selection".

Once information representing "A4" is accepted by the input accepting unit 13 as setting content information that corresponds to the setting item "paper selection", the setting information updating unit 14 starts the setting information updating process. In the setting information updating process, the information representing "A4" accepted by the input accepting unit 13 is stored in the setting information storage unit 12 as new setting content information K2 (FIG. 7) which corresponds to the setting item "paper selection" stored in the setting information storage unit 12.

Moreover, details of the selected item storage unit 15, the setting item selecting unit 16, the function setting information transmitting unit 17, the disabled function setting information transmitting unit 18, the hidden setting item receiving unit 19, the selected item excluding unit 20, and the updated setting information transmitting unit 21 will be described later.

Meanwhile, as shown in FIG. 5, the mobile terminal device 9 includes a touch panel device 91, a radio communicating unit 92, and a mobile-side control unit 90.

The touch panel device 91 includes a liquid crystal display (mobile-side display unit) 911 equipped with a touch panel function in a similar manner to the touch panel device 71 included in the multifunction machine 1. Due to the touch panel function, when a software key displayed on the liquid crystal display 911 is touched by the user, the touch panel device 91 accepts an instruction that corresponds to the touch operation of the software key. In addition, due to the touch panel function, the touch panel device 91 recognizes a trajectory of a position touched by the user on the liquid crystal display 911. Based on the recognized trajectory, the touch panel device 91 accepts an instruction that corresponds to a predetermined gesture operation such as a tapping operation, a double-tapping operation, a pinching operation, and a swiping operation.

The radio communicating unit 92 is an interface circuit for performing radio communication of various types of data with the radio communicating unit 803 included in the multifunction machine 1 via Bluetooth (registered trademark), infrared communication, or the like. Various types of data include binary data and the like which represent respective setting items set in the multifunction machine 1 and setting contents that correspond to the setting items.

The mobile-side control unit 90 controls operations of the entire mobile terminal device 9 by controlling operations of the touch panel device 91 and the radio communicating unit 92. For example, the mobile-side control unit 90 is configured to include a CPU which executes predetermined arithmetic processing, a non-volatile memory which stores a predetermined control program such as an EEPROM, a RAM which temporarily stores data, and peripheral circuitry thereof.

By executing a control program stored in the non-volatile memory, the mobile-side control unit 90 controls operations of the touch panel device 91 and the radio communicating unit 92. In particular, the mobile-side control unit 90 functions as a communication object accepting unit 93, a mobile-side receiving unit 94, a display control unit 95, a hidden object accepting unit 96, a hidden setting item transmitting unit 97, a display order change accepting unit 98, and a display order change control unit 99.

The communication object accepting unit 93 alternatively selects any one multifunction machine 1 to be recognized as a communication object among the plurality of multifunction machines 1a to 1c (FIG. 1) included in the function setting control system SYS.

Figure 10:
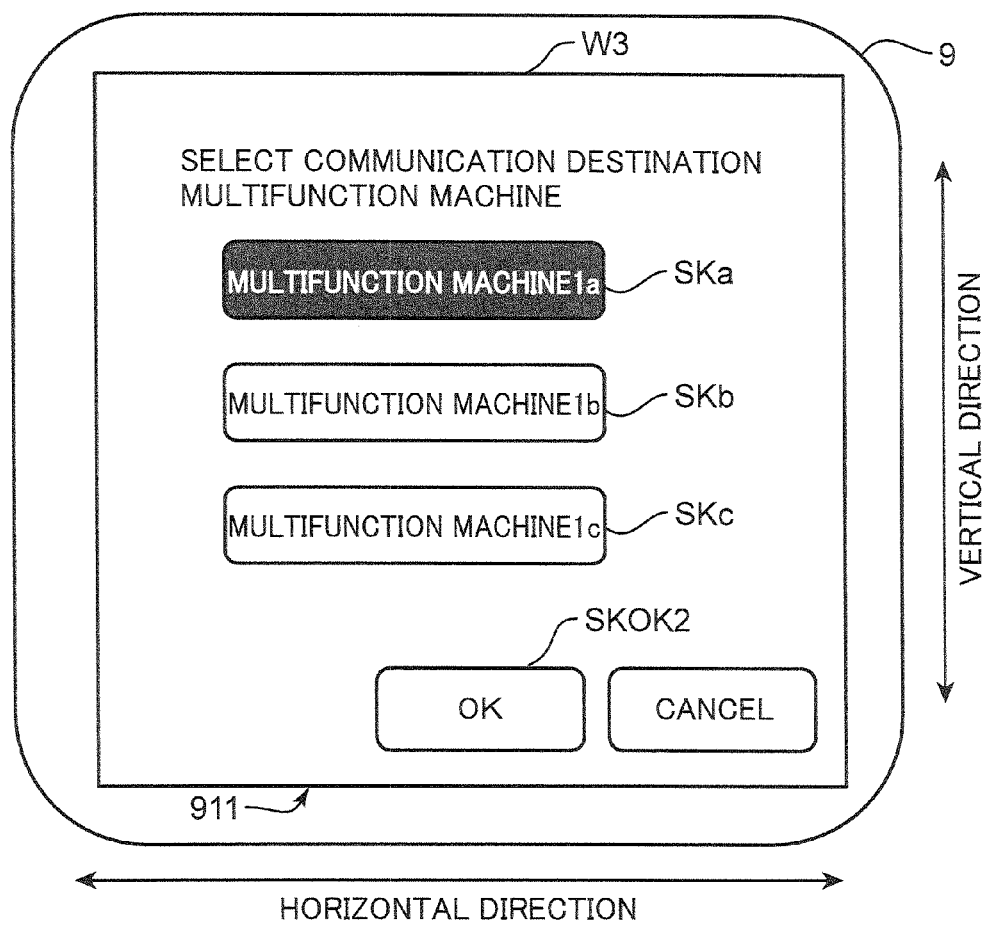
FIG. 10 is an explanatory diagram showing an example of an operation screen for selecting a multifunction machine that is a communication object.

FIG. 10 is an explanatory diagram showing an example of an operation screen for selecting a multifunction machine 1 that is a communication object. For example, as shown in FIG. 10, the communication object accepting unit 93 causes an operation screen W3 to be displayed on the liquid crystal display 911. The operation screen W3 displays software keys SKa to SKc respectively representing the plurality of multifunction machines 1a to 1c included in the function setting control system SYS. Let us assume that the user performs a touch operation of any one of the software keys SKa to SKc and then performs a touch operation of an OK key SKOK2. For example, FIG. 10 shows a situation where a touch operation of the software key SKa representing the multifunction machine 1a has been performed by the user. When a touch operation of the OK key SKOK2 is performed, the communication object accepting unit 93 accepts the multifunction machine 1 represented by the software key on which the touch operation had been performed (in FIG. 10, the multifunction machine 1a represented by the software key SKa) as the communication object multifunction machine 1.

The mobile-side receiving unit 94 issues a request via the radio communicating unit 92 to the communication object multifunction machine 1 to transmit various types of information and receives information transmitted by the communication object multifunction machine 1 in response to the request.

Moreover, details of information received by the mobile-side receiving unit 94 will be described later. In addition, details of the display control unit 95, the hidden object accepting unit 96, the hidden setting item transmitting unit 97, the display order change accepting unit 98, and the display order change control unit 99 will be described later.

Hereinafter, an operation for displaying a list display screen W0 on the liquid crystal display 911 of the mobile terminal device 9 by performing radio communication between the mobile terminal device 9 and the multifunction machine 1 will be described. The list display screen W0 displays setting item information representing a plurality of setting items of the multifunction machine 1 and setting content information that corresponds to the setting item information on one screen. The selected item storage unit 15, the setting item selecting unit 16, the function setting information transmitting unit 17, the disabled function setting information transmitting unit 18, and the display control unit 95 will also be described in detail below. In addition, hereinafter, information associating setting item information and setting content information with each other will be referred to as function setting information.

Figure 11:
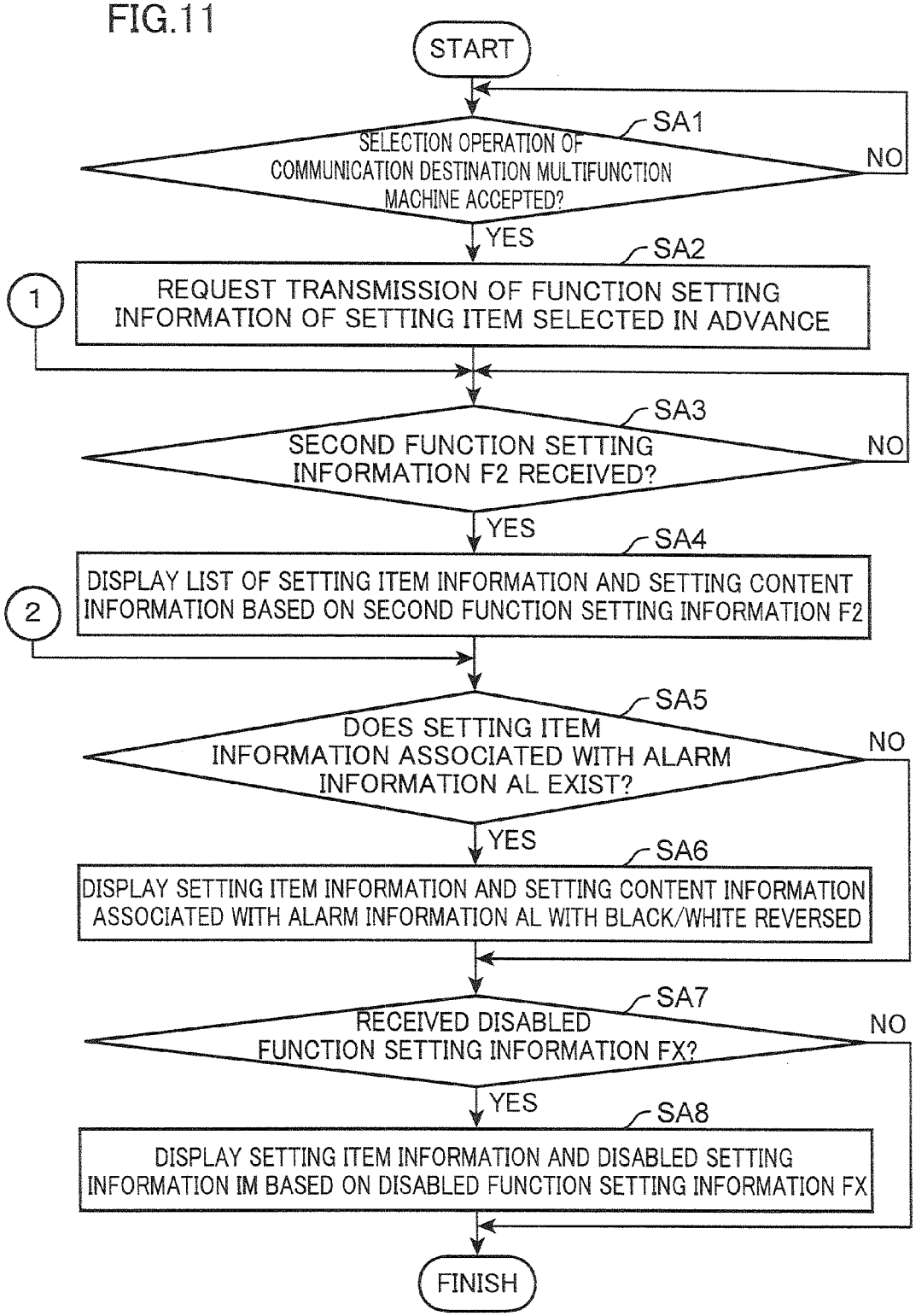
FIG. 11 is a flow chart showing an operation for causing a mobile terminal device to display a list display screen.

FIG. 11 is a flow chart showing an operation for causing the mobile terminal device 9 to display the list display screen W0. As shown in FIG. 11, let us assume that, at the mobile terminal device 9, the communication object accepting unit 93 has accepted an operation for alternatively selecting any one multifunction machine 1 to be a communication object among the plurality of multifunction machines 1a to 1c (FIG. 1) included in the function setting control system SYS (SA1; YES). In this case, the mobile-side receiving unit 94 issues a request via the radio communicating unit 92 to the accepted communication object multifunction machine 1 to transmit function setting information which associates setting item information representing setting items selected in advance as setting items to be displayed on the list display screen W0 and setting content information that corresponds to the setting item information with each other (SA2).

The setting items selected in advance are selected from a list of setting items that can be set by any of the plurality of multifunction machines 1a to 1c included in the function setting control system SYS. The selection operation is performed at the mobile terminal device 9, the respective multifunction machines 1a to 1c, or a terminal device such as a personal computer that is connected to the multifunction machine 1 via the network 805. The setting item information representing the selected setting items is transmitted by the mobile terminal device 9 to the respective multifunction machines 1a to 1c via the radio communicating unit 92 or transmitted from the respective multifunction machines 1a to 1c or the terminal device to the respective multifunction machines 1a to 1c via the network 805. The transmitted setting item information is respectively stored in advance as same selected item information SI in the selected item storage units 15 of the respective multifunction machines 1a to 1c.

Figure 12:
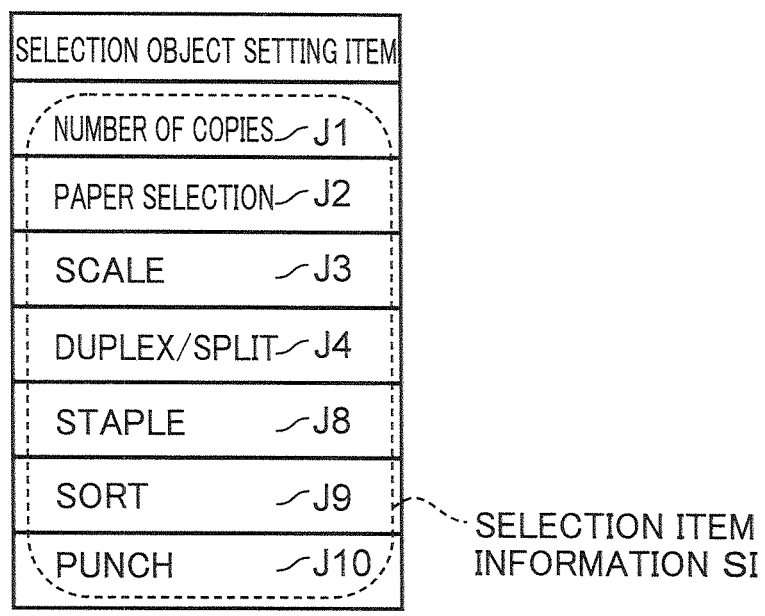
FIG. 12 is an explanatory diagram showing an example of selected item information stored in a selected item storage unit.

FIG. 12 is an explanatory diagram showing an example of selected item information SI stored in the selected item storage unit 15. For example, as shown in FIG. 12, stored as the selected item information SI in the selected item storage unit 15 is setting item information J1 representing the setting item "number of copies", setting item information J2 representing the setting item "paper selection", setting item information J3 representing the setting item "scale", setting item information J4 representing the setting item "duplex/split", setting item information J8 representing a setting item "staple", setting item information J9 representing a setting item "sort", and setting item information J10 representing a setting item "punch".

Figure 13:
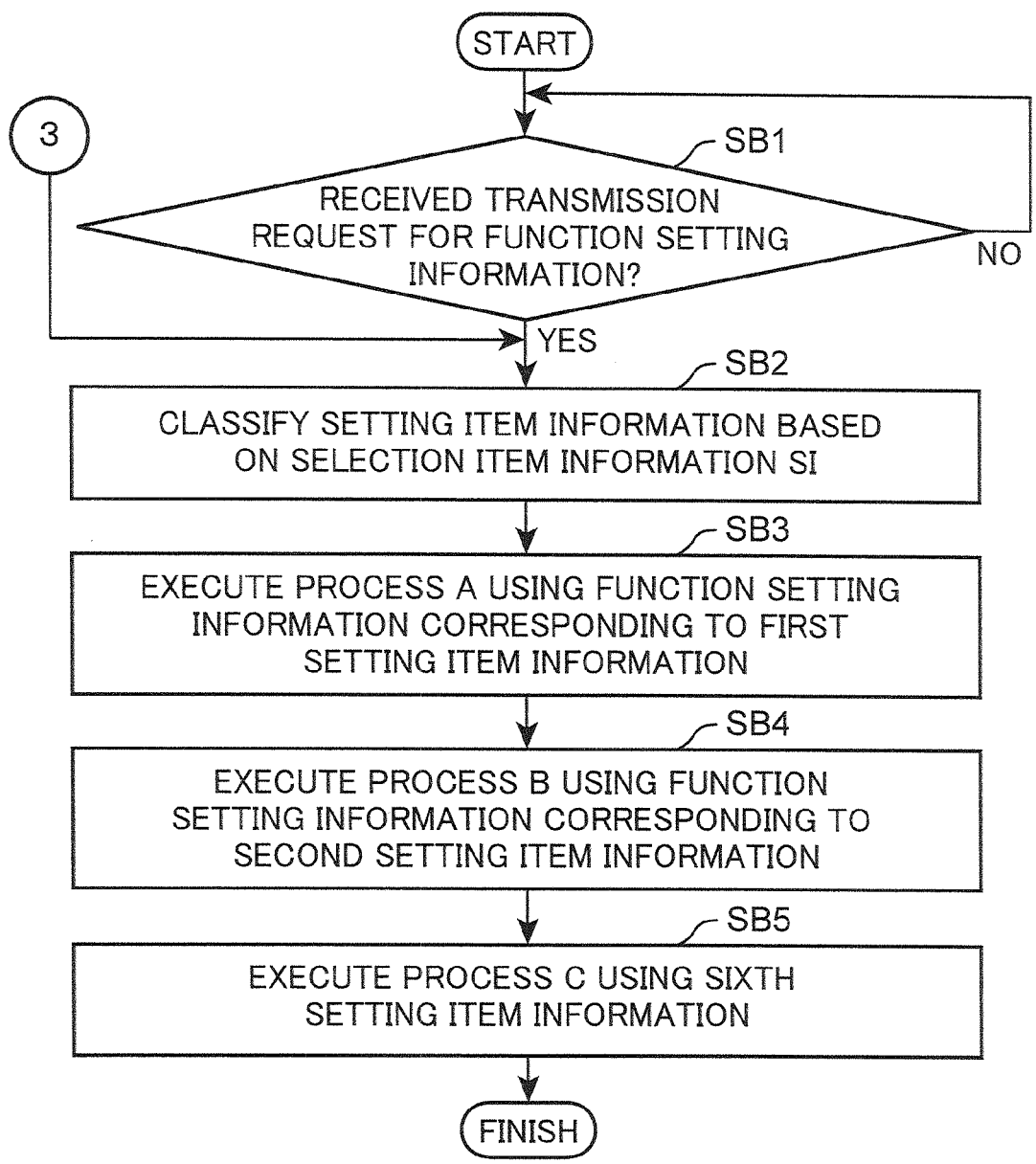
FIG. 13 is a flow chart showing an operation performed by a multifunction machine to transmit function setting information to a mobile terminal device.

FIG. 13 is a flow chart showing an operation performed by the multifunction machine 1 to transmit function setting information to the mobile terminal device 9. As shown in FIG. 13, let us assume that, at the multifunction machine 1, the radio communicating unit 803 has received a transmission request for function setting information from the mobile terminal device 9 (SB1; YES). In this case, the setting item selecting unit 16 classifies the setting item information stored in the setting information storage unit 12 according to whether or not the setting item information represents a setting item that is regarded as a selection object as a setting item to be displayed on the list display screen W0 according to the selected item information SI stored in the selected item storage unit 15 (SB2).

Figure 14:
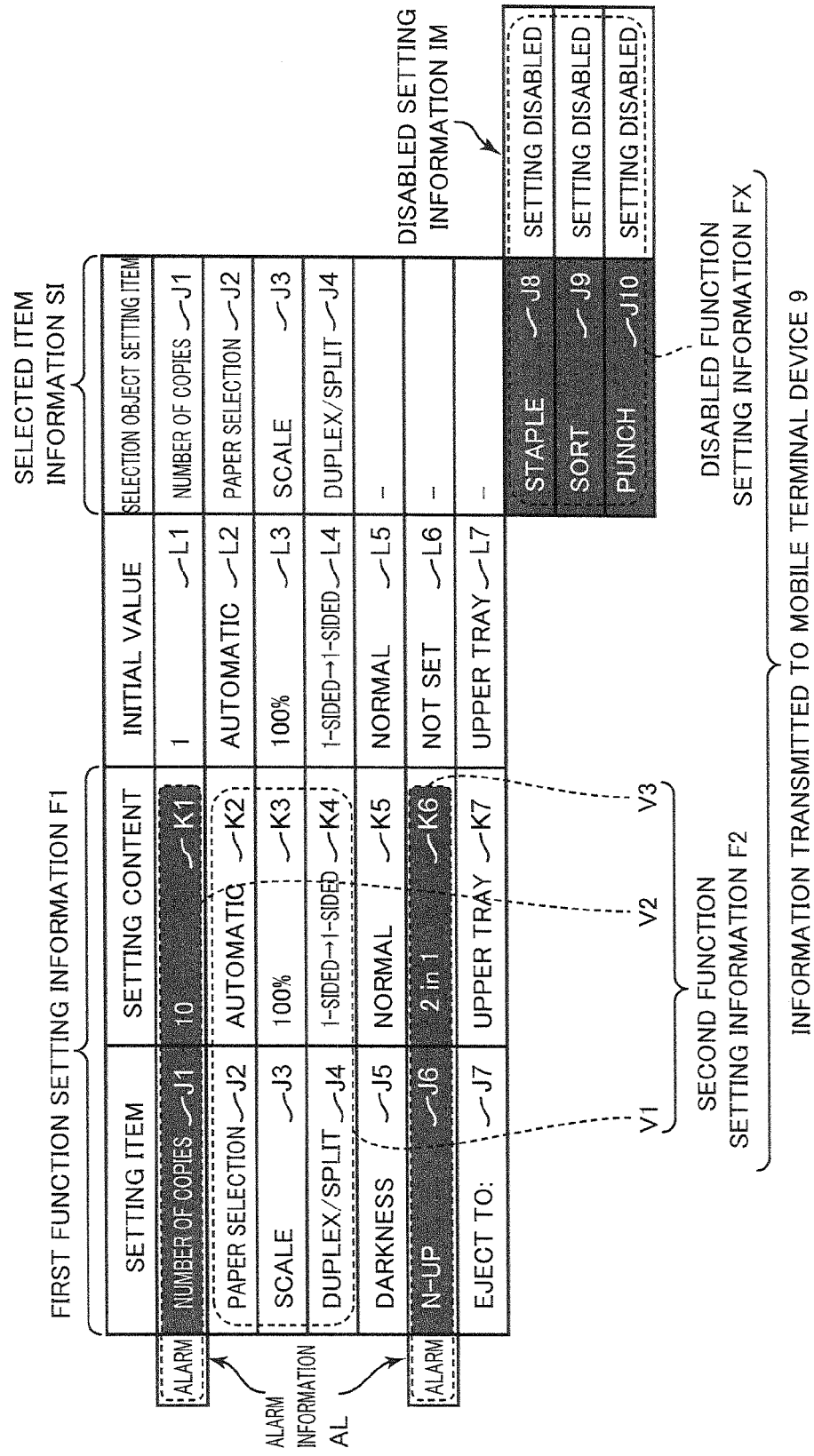
FIG. 14 is an explanatory diagram showing an example of a relationship among information stored in a selected item storage unit, information stored in a setting information storage unit, and information stored in an initial setting information storage unit, and an example of information transmitted from a multifunction machine to a mobile terminal device.

FIG. 14 is an explanatory diagram showing an example of a relationship among information stored in the selected item storage unit 15, information stored in the setting information storage unit 12, and information stored in the initial setting information storage unit 11 and an example of information transmitted from the multifunction machine 1 to the mobile terminal device 9. For example, FIG. 14 shows a situation where the same selected item information SI as shown in FIG. 12 is stored in the selected item storage unit 15. In addition, FIG. 14 shows a situation where, after the first function setting information F1 shown in FIG. 7 had been stored in the setting information storage unit 12 by an initialization process, setting content information K1 that corresponds to the setting item "number of copies" has been updated by the setting information updating process to "10" which differs from the initial value "1" represented by the initial setting content information L1 that corresponds to the setting item "number of copies". In a similar manner, FIG. 14 shows a situation where setting content information K6 that corresponds to the setting item "N-up" has been updated to "2 in 1" which differs from the initial value "not set" represented by the initial setting content information L6 that corresponds to the setting item "N-up".

Hereinafter, a case where the radio communicating unit 803 receives a transmission request for function setting information from the mobile terminal device 9 will be described in detail on the assumption that information is respectively stored in the selected item storage unit 15, the setting information storage unit 12, and the initial setting information storage unit 11 as shown in FIG. 14.

As shown in FIG. 14, the pieces of setting item information J1 to J4 stored in the setting information storage unit 12 are included in the selected item information SI. On the other hand, the pieces of setting item information J5 to J7 stored in the setting information storage unit 12 are not included in the selected item information SI. Therefore, in step SB2, the setting item selecting unit 16 classifies the pieces of setting item information J1 to J7 into pieces of first setting item information J1 to J4 representing setting items that are regarded as selection objects according to the selected item information SI and pieces of second setting item information J5 to J7 representing setting items that are not regarded as selection objects according to the selected item information SI.

Next, the function setting information transmitting unit 17 executes a process A using function setting information that corresponds to the pieces of first setting item information J1 to J4 classified in step SB2 among the first function setting information F1 stored in the setting information storage unit 12 (SB3). On the other hand, the function setting information transmitting unit 17 executes a process B using function setting information that corresponds to the pieces of second setting item information J5 to J7 classified in step SB2 among the first function setting information F1 stored in the setting information storage unit 12 (SB4).

FIG. 15A is a flow chart showing the process A that is executed in an operation performed by the multifunction machine 1 to transmit function setting information to the mobile terminal device 9, FIG. 15B is a flow chart showing the process B that is executed in an operation performed by the multifunction machine 1 to transmit function setting information to the mobile terminal device 9, and FIG. 15C is a flow chart showing a process C that is executed in an operation performed by the multifunction machine 1 to transmit function setting information to the mobile terminal device 9.

As shown in FIG. 15A, in step SB3, the function setting information transmitting unit 17 executes the process A that is made up of steps SC1 to SC3 described below. When starting the execution of the process A, the function setting information transmitting unit 17 first classifies the pieces of first setting item information J1 to J4 according to whether or not the pieces of setting content information K1 to K4 respectively associated with the pieces of first setting item information J1 to J4 are the same as the pieces of initial setting content information L1 to L4 that respectively correspond to the pieces of first setting item information J1 to J4 (SC1).

As shown in FIG. 14, the pieces of setting content information K2 to K4 among the pieces of setting content information K1 to K4 respectively associated with the pieces of first setting item information J1 to J4 are the same as the pieces of initial setting content information L2 to L4. On the other hand, the setting content information K1 associated with the first setting item information J1 differs from the initial setting content information L1. Therefore, in step SC1, the function setting information transmitting unit 17 classifies the pieces of first setting item information J1 to J4 into pieces of third setting item information J2 to J4 whose setting content information is the same as the initial setting content information and fourth setting item information J1 (changed setting item information) whose setting content information differs from the initial setting content information.

Next, the function setting information transmitting unit 17 transmits information V1 which associates the pieces of third setting item information J2 to J4 and corresponding pieces of setting content information K2 to K4 with each other to the mobile terminal device 9 (SC2: function setting information transmission process).

In addition, the function setting information transmitting unit 17 transmits information V2 which associates the fourth setting item information J1, corresponding setting content information K1, and alarm information AL that is information representing an alarm with each other to the mobile terminal device 9 (SC3: function setting information transmission process).

Meanwhile, as shown in FIG. 15B, in step SB4, the function setting information transmitting unit 17 executes the process B that is made up of steps SD1 and SD2 described below. When starting the execution of the process B, the function setting information transmitting unit 17 first acquires, from the pieces of second setting item information J5 to J7, fifth setting item information (changed setting item information) in which the pieces of setting content information K5 to K7 respectively associated with the pieces of second setting item information J5 to J7 differ from the pieces of initial setting content information L5 to L7 that respectively correspond to the pieces of second setting item information J5 to J7 (SD1).

As shown in FIG. 14, among the pieces of setting content information K5 to K7 respectively associated with the pieces of second setting item information J5 to J7, the pieces of setting content information K5 and K7 are the same as the pieces of initial setting content information L5 and L7. On the other hand, the setting content information K6 associated with the setting item information J6 differs from the initial setting content information L6. Therefore, in step SD1, the function setting information transmitting unit 17 acquires the second setting item information J6 as the fifth setting item information.

In addition, as shown in FIG. 15B, the function setting information transmitting unit 17 transmits information V3 which associates the fifth setting item information J6 acquired in step SD1, corresponding setting content information K6, and alarm information AL with each other to the mobile terminal device 9 (SD2: function setting information transmission process).

As shown, the function setting information transmitting unit 17 transmits the pieces of information V1 to V3 described above to the mobile terminal device 9 as second function setting information F2 which includes at least a part of pieces of setting item information among the plurality of pieces of setting item information included in the first function setting information F1 and setting content information that corresponds to the at least part of pieces of setting item information.

Referring once again to FIG. 13, after executing step SB4, the disabled function setting information transmitting unit 18 executes the process C using sixth setting item information (setting-disabled setting item information) that is not stored in the setting information storage unit 12 among the setting item information representing setting items that are regarded as selection objects according to the selected item information SI (SB5).

Specifically, as shown in FIG. 14, among the pieces of setting item information J1 to J4 and J8 to J10 representing setting items that are regarded as selection objects according to the selected item information SI, the pieces of setting item information J8 to J10 are not stored in the setting information storage unit 12. For example, let us assume that the post-processing unit 3 is mounted to the multifunction machine 1b. In this case, at the multifunction machine 1b, setting items respectively represented by the pieces of setting item information J8 to J10 for controlling functions of the post-processing unit 3 can be set. Therefore, at the multifunction machine 1b, the pieces of setting item information J8 to J10 can be stored in the selected item storage unit 15 as the selected item information SI. Let us also assume that the communication object multifunction machine 1a is not provided with the post-processing unit 3 or that the post-processing unit 3 is detached from the body portion 100 for repair. In this case, at the multifunction machine 1a, setting items respectively represented by the pieces of setting item information J8 to J10 cannot be set. As a result, at the multifunction machine 1a, the pieces of setting item information J8 to J10 are not stored in the setting information storage unit 12.

Therefore, in step SB5, the disabled function setting information transmitting unit 18 executes the process C using pieces of sixth setting item information J8 to J10 that are not stored in the setting information storage unit 12 among the pieces of setting item information J1 to J4 and J8 to J10 representing setting items that are regarded as selection objects according to the selected item information SI.

In step SB5, as shown in FIG. 15C, the disabled function setting information transmitting unit 18 executes the process C constituted by step SE1 described below. When starting the execution of the process C, the disabled function setting information transmitting unit 18 transmits disabled function setting information FX which associates the pieces of sixth setting item information J8 to J10 (FIG. 14) and disabled setting information IM (for example, a character string that reads "disabled setting" shown in FIG. 14) with each other to the mobile terminal device 9 (SE1). The disabled setting information IM is information representing that the setting item represented by the sixth setting item information does not exist.

On the other hand, as shown in FIG. 11, let us assume that, at the mobile terminal device 9, second function setting information F2 is received by the mobile-side receiving unit 94 via the radio communicating unit 92 (SA3; YES). In this case, the display control unit 95 performs a list display process in which the display control unit 95 causes the liquid crystal display 911 to display the list display screen W0 based on the received second function setting information F2 (SA4). On the list display screen W0, the display control unit 95 associates the setting item information included in the second function setting information F2 and the setting content information associated with the setting item information included in the second function setting information F2 with each other and displays the associated information on a single screen.

Figure 16:
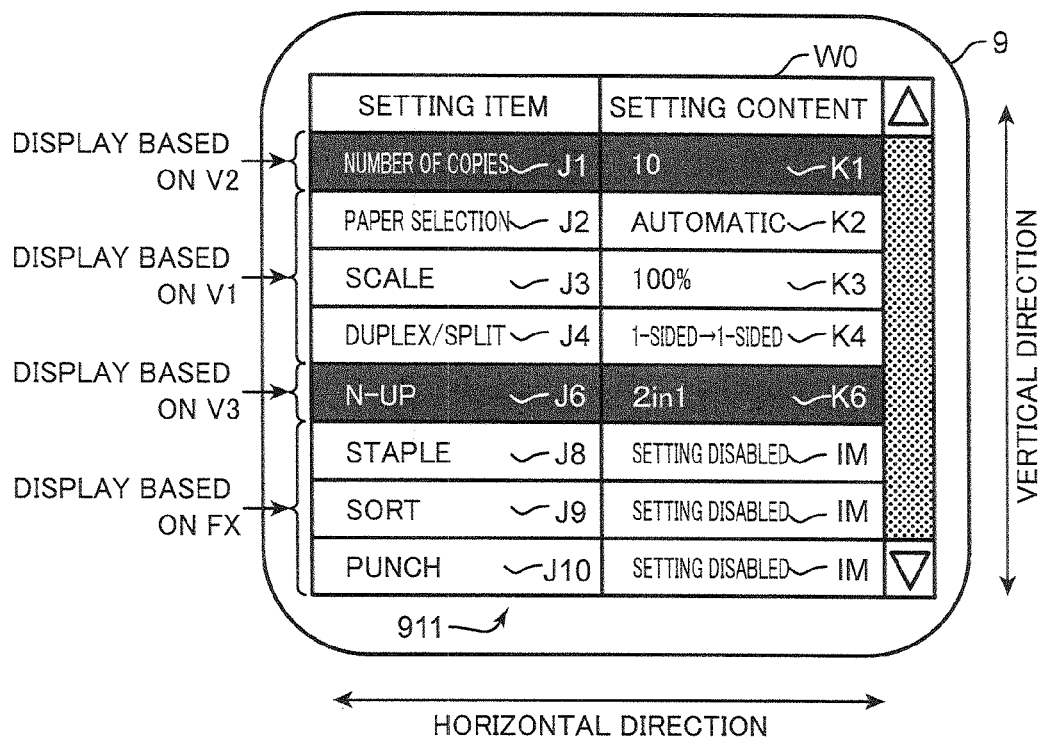
FIG. 16 is an explanatory diagram showing an example of a list display screen.

FIG. 16 is an explanatory diagram showing an example of the list display screen W0. For example, let us assume that, in step SA3, the second function setting information F2 shown in FIG. 14 is received by the mobile-side receiving unit 94. In this case, as shown in FIG. 16, the display control unit 95 performs a list display process involving associating the pieces of setting item information J2 to J4 included in the information V1 included in the second function setting information F2 and the pieces of setting content information K2 to K4 that correspond to the pieces of setting item information J2 to J4 with each other based on the information V1, and displays the associated information on the list display screen W0.

In addition, the display control unit 95 performs a list display process involving associating the setting item information J1 included in the information V2 included in the second function setting information F2 and the setting content information K1 that corresponds to the setting item information J1 with each other based on the information V2, and displays the associated information on the list display screen W0. Furthermore, as shown in FIG. 14, the alarm information AL is associated with the setting item information J1 included in the information V2. When setting item information to which the alarm information AL is associated exists in this manner (SA5; YES), the display control unit 95 further identifiably displays the setting item information J1 associated with the alarm information AL and the setting content information K1 that corresponds to the setting item information J1 by displaying the setting item information J1 and the setting content information K1 with black and white reversed or the like (SA6).

In a similar manner, the display control unit 95 performs a list display process involving associating the setting item information J6 included in the information V3 included in the second function setting information F2 and the setting content information K6 that corresponds to the setting item information J6 with each other based on the information V3, and displays the associated information on the list display screen W0. In addition, as shown in FIG. 14, since the alarm information AL is associated with the setting item information J6 included in the information V3 (SA5; YES), the display control unit 95 identifiably displays the setting item information J6 and the setting content information K6 that corresponds to the setting item information J6 by displaying the setting item information J6 and the setting content information K6 with black and white reversed or the like (SA6).

Moreover, in step SA6, the display control unit 95 may identifiably display any one of the pieces of setting item information associated with the alarm information AL and the pieces of setting content information that corresponds to the setting item information. In addition, a method of identifiably displaying information is not limited to black/white reverse display, and the information may alternatively be displayed in red or in bold characters.

Furthermore, let us assume that disabled function setting information FX has been received by the mobile-side receiving unit 94 via the radio communicating unit 92 (SA7; YES). In this case, based on the received disabled function setting information FX, the display control unit 95 further associates setting item information included in the disabled function setting information FX and disabled setting information IM associated with the setting item information included in the disabled function setting information FX with each other, and displays the associated information on the list display screen W0 (SA8).

Specifically, let us assume that, in step SA7, the disabled function setting information FX shown in FIG. 14 is received by the mobile-side receiving unit 94. In this case, as shown in FIG. 16, in step SA8, the display control unit 95 associates pieces of setting item information J8 to J10 included in the disabled function setting information FX and disabled setting information IM associated with the pieces of setting item information J8 to J10 with each other, and displays the associated information on the list display screen W0.

According to the embodiment, the multifunction machine 1 is capable of transmitting second function setting information F2 which includes at least a part of pieces of setting item information among the plurality of pieces of setting item information included in the first function setting information F1 and setting content information that corresponds to the at least part of pieces of setting item information to the mobile terminal device 9. At the mobile terminal device 9, the setting item information included in the second function setting information F2 received from the multifunction machine 1 and setting content information associated with the setting item information included in the second function setting information F2 are associated with each other and displayed in a list on the list display screen W0.

Therefore, by viewing the list display screen W0, the user can readily comprehend at least a part of the setting items set in the multifunction machine 1 and setting contents that correspond to the setting items without operating the multifunction machine 1 and even when performing an operation of the multifunction machine 1.

In addition, according to the embodiment, the number of setting items displayed on the list display screen W0 is reduced to the number of pieces of setting item information selected by the setting item selecting unit 16. Therefore, the list display screen W0 can be more readily visually confirmed by the user. As a result, the user can improve efficiency of confirmation work of setting items and setting contents that correspond to the setting items. Therefore, for example, by storing only pieces of setting item information representing setting items which conceivably require setting contents to be confirmed as selected item information SI in the selected item storage unit 15, contents displayed on the list display screen W0 can be limited to only setting items which conceivably require setting contents to be confirmed and setting contents that correspond to the setting items. Accordingly, the user can improve the efficiency of confirmation work of setting contents.

For example, let us assume that setting item information representing setting items for controlling functions provided in the post-processing unit 3 such as sorting and stapling are included in setting item information that is regarded as a selection object according to the selected item information SI. In this case, when the multifunction machine 1 does not include the post-processing unit 3 or when the post-processing unit 3 is detached from the multifunction machine 1, setting contents that correspond to the setting items for controlling functions provided in the post-processing unit 3 cannot be set. In this case, there is a risk that setting item information representing setting items for controlling functions provided in the post-processing unit 3 and setting content information that corresponds to the setting item information cannot be stored in the setting information storage unit 12.

In such a case, according to the embodiment, disabled function setting information FX which associates setting item information that differs from the setting item information included in the first function setting information F1 among the pieces of setting item information that are regarded as selection objects according to the selected item information SI and disabled setting information IM with each other is transmitted to the mobile terminal device 9. In addition, the setting item information included in the disabled function setting information FX and the disabled setting information IM that corresponds to the setting item information included in the disabled function setting information FX are associated with each other and displayed on the list display screen W0.

Therefore, by visually confirming the disabled setting information IM displayed on the list display screen W0, the user can readily comprehend that the setting content that corresponds to the setting item corresponding to the disabled setting information IM cannot be set.

In addition, according to the embodiment, by visually confirming at least one of the pieces of setting item information and the pieces of setting content information associated with the pieces of setting item information identifiably displayed on the list display screen W0, the user can readily comprehend that the setting content corresponding to the setting item represented by the setting item information differs from the initial value of the setting content.

Furthermore, according to the embodiment, even in the case of a different multifunction machine 1, the same selected item information SI is stored in the selected item storage units 15 of the respective multifunction machines 1. Therefore, the same setting item information that is regarded as a selection object according to the same selected item information SI and setting content information that corresponds to the setting item information are displayed on the list display screen W0. As a result, even when operation methods for confirming setting content information differ among the multifunction machines 1, the user need not be adept at each operation method and can readily confirm setting item information that is regarded as a selection object according to the selected item information SI in the communication object multifunction machine 1 and setting content information that corresponds to the setting item information.

In addition, according to the embodiment, let us assume that an input operation of setting content information that corresponds to any of the setting items has been accepted by the input accepting unit 13. In this case, the setting content information that corresponds to the accepted setting item stored in the setting information storage unit 12 is updated by the setting information updating unit 14 to the accepted setting content information. Therefore, when the updated setting content information is included in the second function setting information F2, the updated setting content information is transmitted to the mobile terminal device 9 by the function setting information transmitting unit 17. Accordingly, the user can visually confirm the updated setting content information displayed on the list display screen W0. As a result, the user can comprehend that the setting content corresponding to the updated setting content information has been updated at the multifunction machine 1.

Hereinafter, an operation for hiding a combination inputted by the user among combinations of setting item information and setting content information that corresponds to the setting item information which are displayed on the list display screen W0 will be described. In addition, details of the hidden object accepting unit 96, the hidden setting item transmitting unit 97, the hidden setting item receiving unit 19, and the selected item excluding unit 20 will be given in the description.

Figure 17:
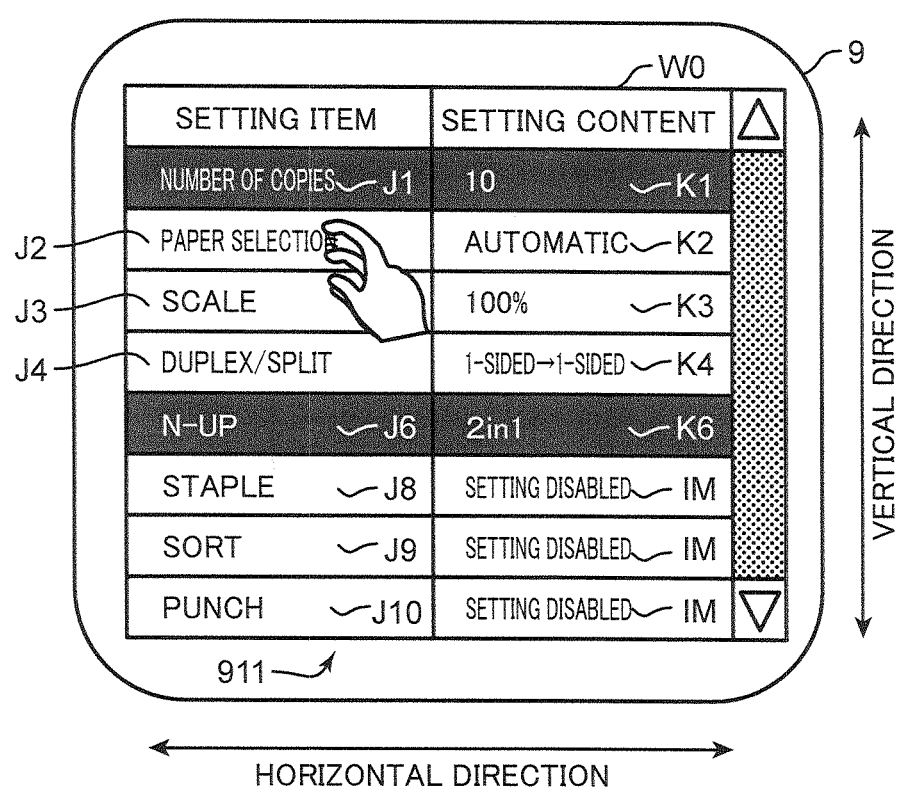
FIG. 17 is an explanatory diagram showing an operation for inputting setting item information of an object to be hidden among setting item information displayed on a list display screen.
Figure 18A:
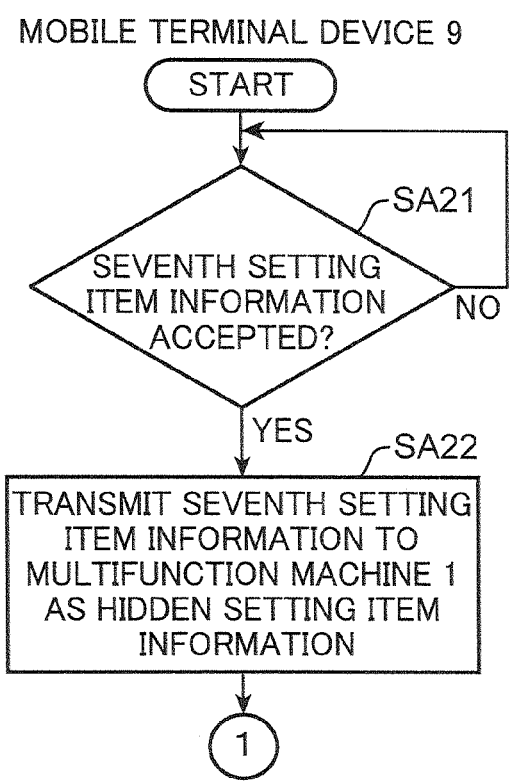
FIG. 18A is a flow chart showing an operation performed by a mobile terminal device to hide any of pieces of setting item information displayed on a list display screen.
Figure 18B:
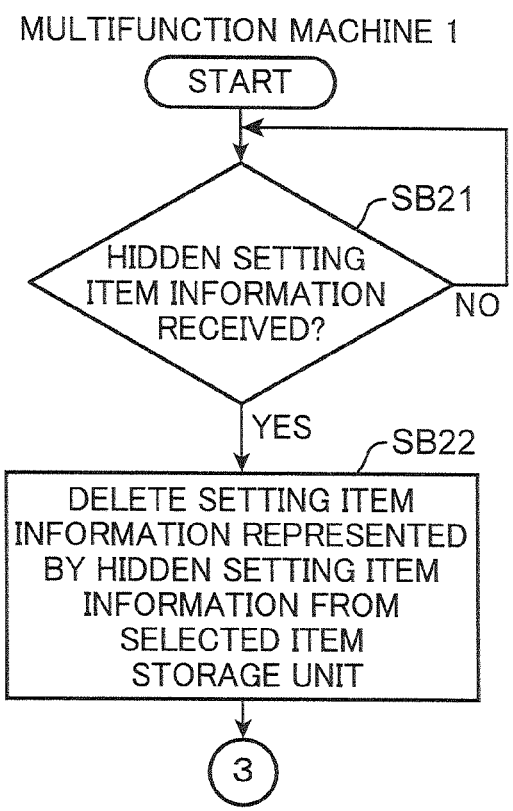
FIG. 18B is a flow chart showing an operation performed by a multifunction machine to hide any of pieces of setting item information displayed on the list display screen.
Figure 19:
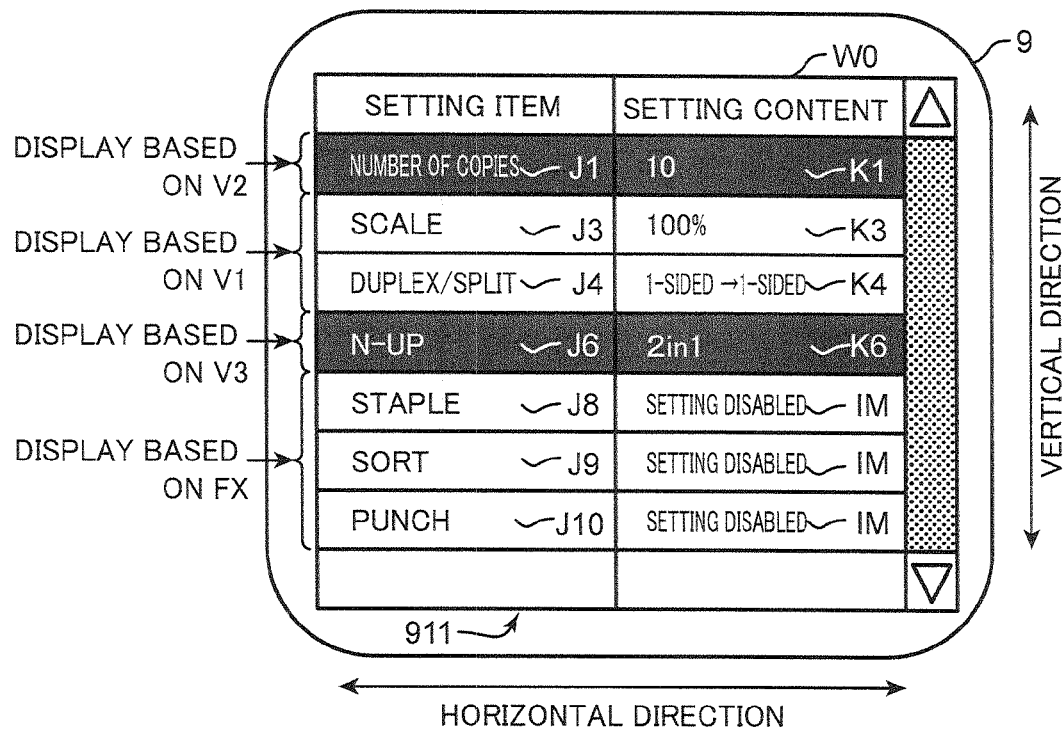
FIG. 19 is an explanatory diagram showing an example of a list display screen after an operation for hiding any of the pieces of setting item information displayed on the list display screen has been performed.

FIG. 17 is an explanatory diagram showing an operation for inputting setting item information of an object to be hidden among setting item information displayed on the list display screen W0. FIG. 18A is a flow chart showing an operation performed by the mobile terminal device 9 to hide any of pieces of setting item information displayed on the list display screen W0. FIG. 18B is a flow chart showing an operation performed by the multifunction machine 1 to hide any of pieces of setting item information displayed on the list display screen W0. FIG. 19 is an explanatory diagram showing an example of the list display screen W0 after an operation for hiding any of pieces of setting item information displayed on the list display screen W0 has been performed.

For example, let us assume that a double-tapping operation has been performed on any of the pieces of setting item information displayed on the list display screen W0. In this case, judging that an input operation of setting item information that is an object to be hidden has been performed, the hidden object accepting unit 96 accepts the setting item information on which the double-tapping operation had been performed as seventh setting item information that is an object to be hidden.

For example, FIG. 17 shows that a double-tapping operation has been performed on setting item information J2 representing the setting item "paper selection" among the pieces of setting item information J1 to J4, J6, and J8 to J10 displayed on the list display screen W0. In this case, the hidden object accepting unit 96 accepts the setting item information J2 representing the setting item "paper selection" as the seventh setting item information. Moreover, an input operation of setting item information that is an object to be hidden is not limited to a double-tapping operation and may instead be a swiping operation or the like involving moving the setting item information that is an object to be hidden to outside of the liquid crystal display 911 while maintaining contact with the setting item information.

As shown in FIG. 18A, let us assume that the seventh setting item information has been accepted by the hidden object accepting unit 96 at the mobile terminal device 9 (SA21; YES). In this case, the hidden setting item transmitting unit 97 transmits the seventh setting item information as hidden setting item information to the multifunction machine 1 via the radio communicating unit 92 (SA22).

For example, let us assume that the setting item information J2 (FIG. 17) representing the setting item "paper selection" has been accepted by the hidden object accepting unit 96 as the seventh setting item information. In this case, the hidden setting item transmitting unit 97 transmits the setting item information J2 as hidden setting item information to the multifunction machine 1.

Subsequently, processes of step SA3 and thereafter (FIG. 11) are performed at the mobile terminal device 9.

Meanwhile, at the multifunction machine 1, as shown in FIG. 18B, the hidden setting item receiving unit 19 receives, via the radio communicating unit 803, the hidden setting item information transmitted by the hidden setting item transmitting unit 97 (SB21; YES). In this case, the selected item excluding unit 20 deletes setting item information which is represented by the received hidden setting item information and which is stored in the selected item storage unit 15. Accordingly, the selected item excluding unit 20 deletes the setting item information represented by the hidden setting item information received by the hidden setting item receiving unit 19 from the setting item information that is regarded as a selection object according to the selected item information SI (SB22).

Subsequently, processes of step SB2 and thereafter (FIG. 13) are performed at the multifunction machine 1.

Specifically, let us assume that, for example, the hidden setting item information received in step SB21 is the setting item information J2 (FIG. 17) representing the setting item "paper selection". In this case, in step SB22, as shown in FIG. 14, the selected item excluding unit 20 deletes the setting item information J2 among the pieces of setting item information J1 to J4 and J8 to J10 stored in the selected item storage unit 15.

Next, in step SB2 (FIG. 13), the setting item selecting unit 16 classifies pieces of setting item information J1 to J7 (FIG. 14) stored in the setting information storage unit 12 into pieces of first setting item information J1, J3, and J4 and pieces of second setting item information J2 and J5 to J7.

Therefore, in step SB3 (FIG. 13), the process A using function setting information that corresponds to the setting item information J2 is not executed. Accordingly, the function setting information that corresponds to the setting item information J2 is not included in any of the pieces of information V1 and V2 (FIG. 14) transmitted to the mobile terminal device 9 in steps SC2 and SC3 (FIG. 15A).

On the other hand, in step SB4 (FIG. 13), the process B using the function setting information that corresponds to the setting item information J2 is executed. In this case, in the example shown in FIG. 14, the setting content information K2 that corresponds to the setting item information J2 is the same as the initial setting content information L2 that corresponds to the setting item information J2. Therefore, in step SD2 (FIG. 15B), the function setting information that corresponds to the setting item information J2 is also not included in the information V3 (FIG. 14) transmitted to the mobile terminal device 9.

Subsequently, steps SA3 to SA6 (FIG. 11) are performed at the mobile terminal device 9. In this case, as shown in FIG. 19, based on the second function setting information F2, the pieces of setting item information J1, J3, J4, and J6 (FIG. 14) and pieces of setting content information K1, K3, K4, and K6 (FIG. 14) that correspond to the setting item information are associated with each other and displayed on the list display screen W0. In addition, in step SA7 (FIG. 11), based on the disabled function setting information FX, the pieces of setting item information J8 to J10 and the disabled setting information IM are associated with each other and displayed on the list display screen W0.

As another specific example, let us assume that, in step SA21 (FIG. 18A), the setting item information J1 representing the setting item "number of copies" is accepted as setting item information that is an object to be hidden by the hidden object accepting unit 96. In this case, in step SB21 (FIG. 18B), the hidden setting item receiving unit 19 receives the setting item information J1 representing the setting item "number of copies" as hidden setting item information. In this case, in step SB22 (FIG. 18B), the selected item excluding unit 20 deletes the setting item information J1 among the pieces of setting item information J1 to J4 and J8 to J10 (FIG. 14) stored in the selected item storage unit 15.

Next, in step SB2 (FIG. 13), the setting item selecting unit 16 classifies pieces of setting item information J1 to J7 (FIG. 14) stored in the setting information storage unit 12 into pieces of first setting item information J2 to J4 and pieces of second setting item information J1 and J5 to J7.

Therefore, function setting information that corresponds to the setting item information J1 as hidden setting item information is not an object of the process A in step SB3 (FIG. 13). Accordingly, the function setting information that corresponds to the setting item information J1 is not included in any of the pieces of information V1 and V2 (FIG. 14) transmitted to the mobile terminal device 9 in steps SC2 and SC3 (FIG. 15A).

On the other hand, the function setting information that corresponds to the setting item information J1 as hidden setting item information is an object of the process B in step SB4 (FIG. 13). In this case, in the example shown in FIG. 14, the setting content information K1 that corresponds to the setting item information J1 differs from the initial setting content information L1 that corresponds to the setting item information J1. Therefore, in step SD2 (FIG. 15B), the function setting information that corresponds to the setting item information J1 is included in the information V3 (FIG. 14) transmitted to the mobile terminal device 9.

Subsequently, steps SA3 to SA6 (FIG. 11) are performed at the mobile terminal device 9. In this case, based on the second function setting information F2, the pieces of setting item information J1 to J4 and J6 (FIG. 14) and pieces of setting content information K1 to K4 and K6 (FIG. 14) that correspond to the setting item information are associated with each other and displayed on the list display screen W0. In addition, in step SA7 (FIG. 11), based on the disabled function setting information FX, the pieces of setting item information J8 to J10 and the disabled setting information IM are associated with each other and displayed on the list display screen W0.

In other words, let us assume that even if setting item information is accepted in step SA21 (FIG. 18A) as setting item information that is an object to be hidden (seventh setting item information), setting content information that corresponds to the setting item information differs from initial setting content information. In this case, the setting item information is not hidden but is associated with setting content information that differs from the initial setting content information and displayed on the list display screen W0.

As yet another specific example, let us assume that, in step SA21 (FIG. 18A), the setting item information J8 representing the setting item "staple" is accepted as setting item information that is an object to be hidden by the hidden object accepting unit 96. In this case, in step SB21 (FIG. 18B), the hidden setting item receiving unit 19 receives the setting item information J8 representing the setting item "staple" as hidden setting item information. In step SB22 (FIG. 18B), the selected item excluding unit 20 deletes the setting item information J8 among the pieces of setting item information J1 to J4 and J8 to J10 (FIG. 14) stored in the selected item storage unit 15.

In this case, in step SB5 (FIG. 13), the disabled function setting information transmitting unit 18 executes the process C using pieces of sixth setting item information J9 and J10. In other words, function setting information that corresponds to the setting item information J8 is not an object of the process C in step SB5. Accordingly, the function setting information that corresponds to the setting item information J8 is not included in the disabled function setting information FX (FIG. 14) transmitted to the mobile terminal device 9 in step SE1 (FIG. 15C).

Subsequently, steps SA3 to SA6 (FIG. 11) are performed at the mobile terminal device 9. In this case, based on the second function setting information F2, the pieces of setting item information J1 to J4 and J6 (FIG. 14) and pieces of setting content information K1 to K4 and K6 (FIG. 14) that correspond to the setting item information are associated with each other and displayed on the list display screen W0. In addition, in step SA7 (FIG. 11), based on the disabled function setting information FX, the pieces of setting item information J9 and J10 and the disabled setting information IM are associated with each other and displayed on the list display screen W0.

Specifically, let us assume that setting item information accepted in step SA21 (FIG. 18A) as setting item information that is an object to be hidden (seventh setting item information) is sixth setting item information or, in other words, setting item information which cannot be set and which represents a setting item that cannot be used for operation control of a function by the control unit 10. In this case, the setting item information is hidden and is not displayed on the list display screen W0.

As shown, according to the embodiment, when the user performs an input operation of setting item information representing a setting item for which confirmation of setting content is conceivably unnecessary as an object to be hidden, the setting item information is excluded from setting item information that is regarded as a selection object according to the selected item information SI.

As a result, thereafter, the setting item information inputted as an object to be hidden is not selected as the at least part of pieces of setting item information included in the second function setting information F2 by the setting item selecting unit 16. Therefore, the user is able to visually confirm the list display screen W0 on which setting item information representing a setting item for which confirmation of setting content is conceivably unnecessary and setting content information that corresponds to the setting item information are hidden. Accordingly, the user can improve the efficiency of confirmation work on setting contents.

Hereinafter, an operation for reflecting setting content information updated by the multifunction machine 1 on the list display screen W0 while the list display screen W0 is being displayed will be described. In addition, details of the updated setting information transmitting unit 21 will be given in the description.

Figure 20:
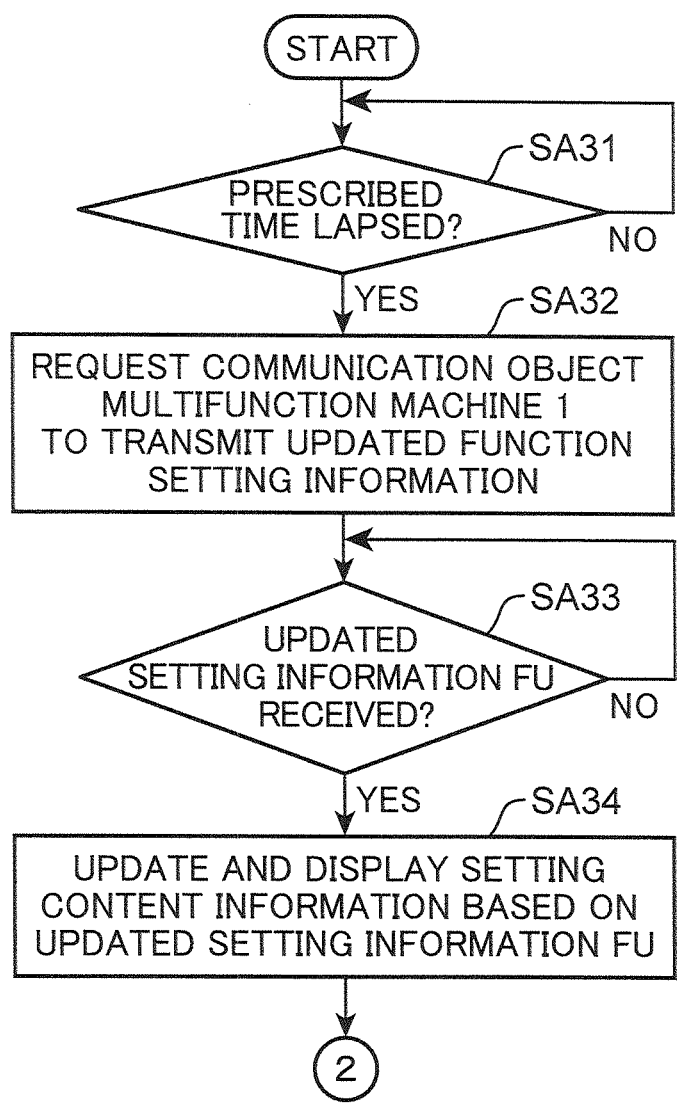
FIG. 20 is a flow chart showing an operation performed by a mobile terminal device to update display of a list display screen.

FIG. 20 is a flow chart showing an operation performed by the mobile terminal device 9 to update display of the list display screen W0. For example, as shown in FIG. 20, when the list display screen W0 is displayed at the mobile terminal device 9, at every lapse of a predetermined prescribed time (SA31; YES), the mobile-side receiving unit 94 issues a request, via the radio communicating unit 92, to the communication object multifunction machine 1 accepted in step SA1 (FIG. 11) to transmit updated function setting information (SA32). Moreover, for example, the predetermined prescribed time is set to around several seconds as the time required to input setting content information corresponding to several setting items and is stored in a non-volatile memory.

Figure 21:
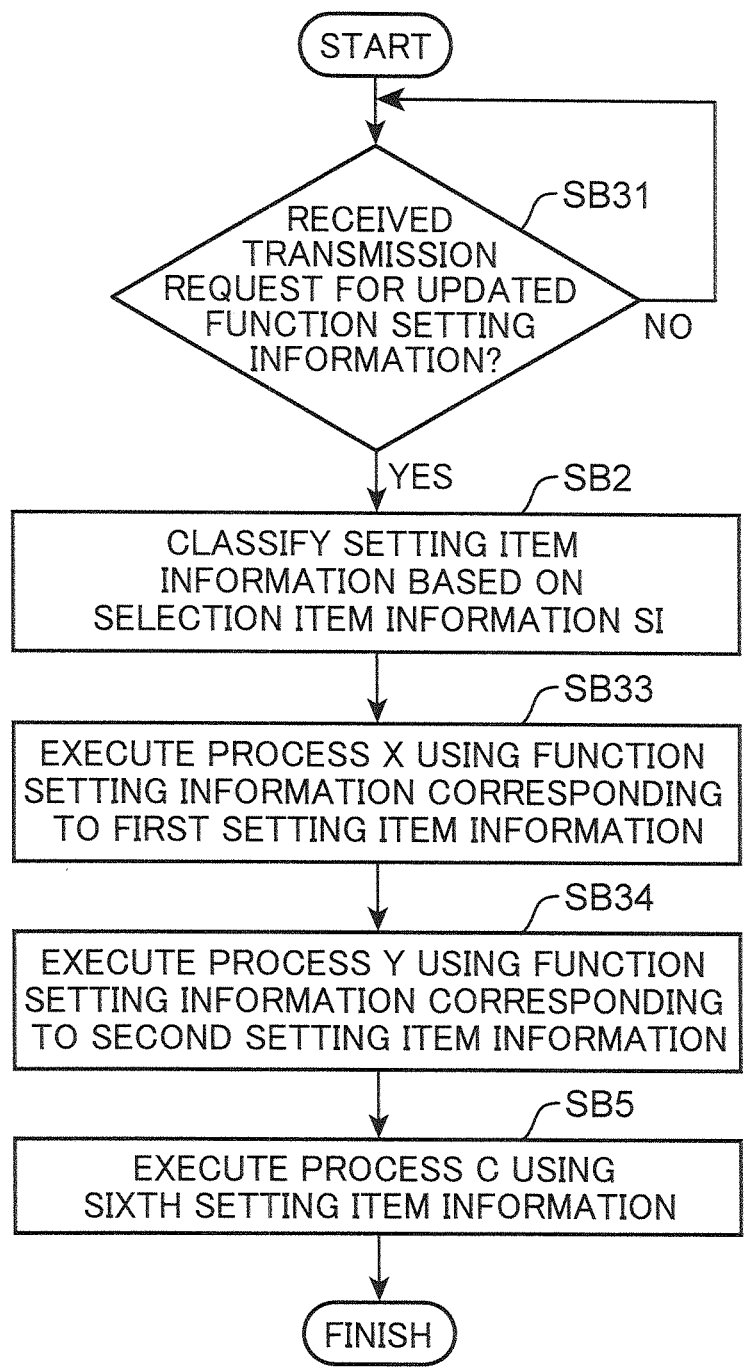
FIG. 21 is a flow chart showing an operation performed by a multifunction machine to transmit updated function setting information to a mobile terminal device.

FIG. 21 is a flow chart showing an operation performed by the multifunction machine 1 to transmit updated function setting information to the mobile terminal device 9. As shown in FIG. 21, at the multifunction machine 1, when the radio communicating unit 803 receives a transmission request for updated function setting information transmitted by the mobile terminal device 9 (SB31; YES), step SB2 is executed (SB2). Moreover, in FIG. 21, steps sharing the same contents as those of FIG. 13 will be denoted by the same reference letters as in FIG. 13 and a description thereof will be omitted.

Figure 22:
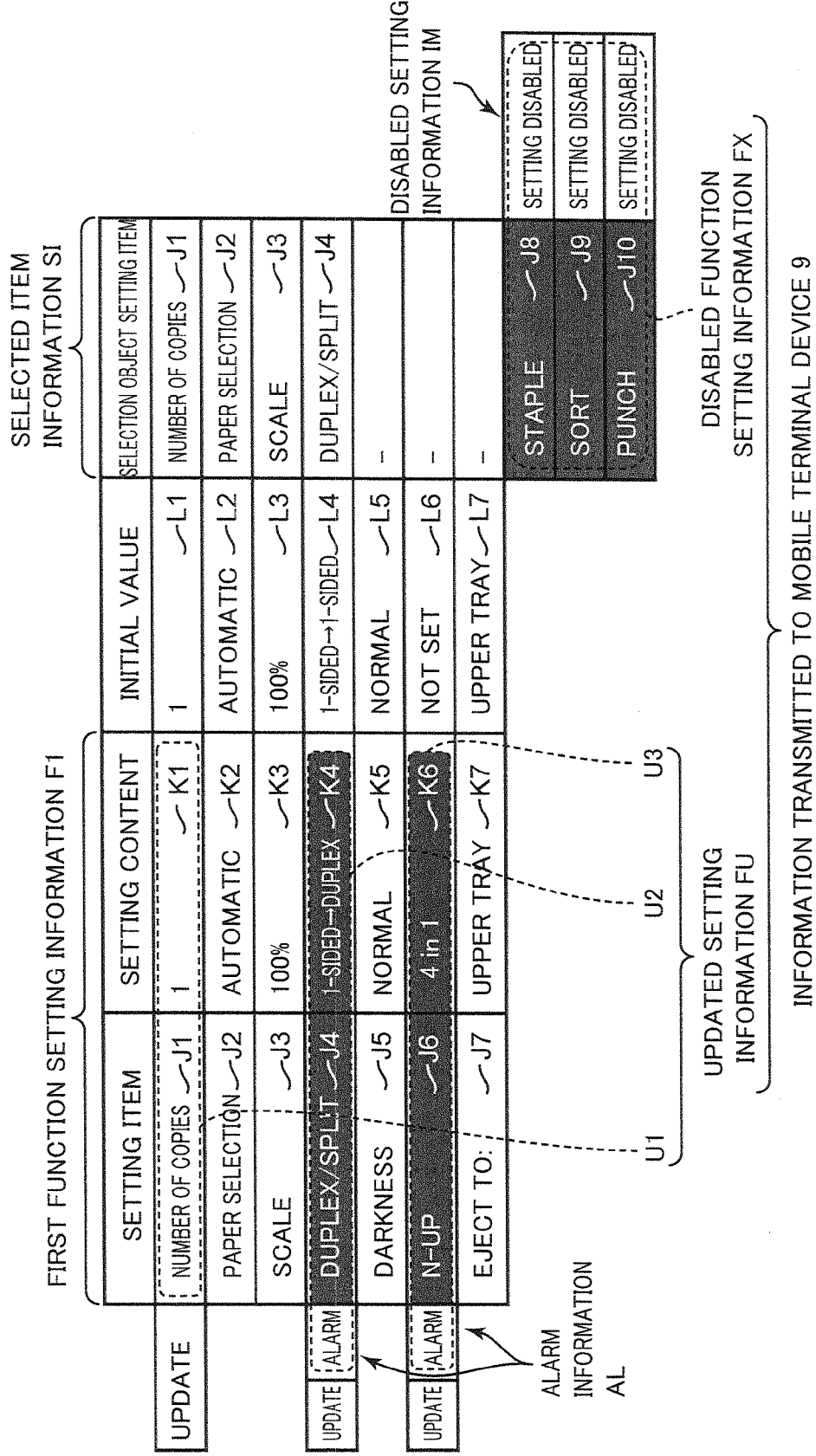
FIG. 22 is an explanatory diagram showing an example of a relationship among information stored in a selected item storage unit, information stored in a setting information storage unit in which first function setting information has been updated, and information stored in an initial setting information storage unit, and an example of information transmitted from a multifunction machine to a mobile terminal device.

FIG. 22 is an explanatory diagram showing an example of a relationship among information stored in the selected item storage unit 15, information stored in the setting information storage unit 12 in which first function setting information F1 has been updated, and information stored in the initial setting information storage unit 11, and an example of information transmitted from the multifunction machine 1 to the mobile terminal device 9.

For example, FIG. 22 shows a situation where the same selected item information SI as shown in FIG. 14 is stored in the selected item storage unit 15. In addition, FIG. 22 shows a situation where, after the first function setting information F1 shown in FIG. 14 had been stored in the setting information storage unit 12, setting content information K1 that corresponds to the setting item "number of copies" has been updated by the setting information updating process to "1" which is the same as the initial value "1" represented by the initial setting content information L1 that corresponds to the setting item "number of copies". In addition, FIG. 22 shows a situation where setting content information K4 that corresponds to the setting item "duplex/split" has been updated by the setting information updating process to "1-sided→duplex" which differs from the initial value "1-sided→1-sided" represented by the initial setting content information L4 that corresponds to the setting item "duplex/split". In a similar manner, FIG. 22 shows a situation where setting content information K6 that corresponds to the setting item "N-up" has been updated to "4 in 1" which differs from the initial value "not set" represented by the initial setting content information L6 that corresponds to the setting item "N-up".

Hereinafter, a case where the radio communicating unit 803 receives a transmission request for updated function setting information from the mobile terminal device 9 will be described in detail on the assumption that information is respectively stored in the selected item storage unit 15, the setting information storage unit 12, and the initial setting information storage unit 11 as shown in FIG. 22.

As shown in FIG. 22, the pieces of setting item information J1 to J4 stored in the setting information storage unit 12 are included in the selected item information SI. On the other hand, the pieces of setting item information J5 to J7 stored in the setting information storage unit 12 are not included in the selected item information SI. Therefore, in step SB2, the setting item selecting unit 16 classifies pieces of setting item information J1 to J7 stored in the setting information storage unit 12 into pieces of first setting item information J1 to J4 and pieces of second setting item information J5 to J7.

Next, the updated setting information transmitting unit 21 executes a process X using function setting information that corresponds to the pieces of first setting item information J1 to J4 classified in step SB2 among the first function setting information F1 stored in the setting information storage unit 12 (SB33). On the other hand, the updated setting information transmitting unit 21 executes a process Y using function setting information that corresponds to the pieces of second setting item information J5 to J7 classified in step SB2 among the first function setting information F1 stored in the setting information storage unit 12 (SB34).

Figure 23:
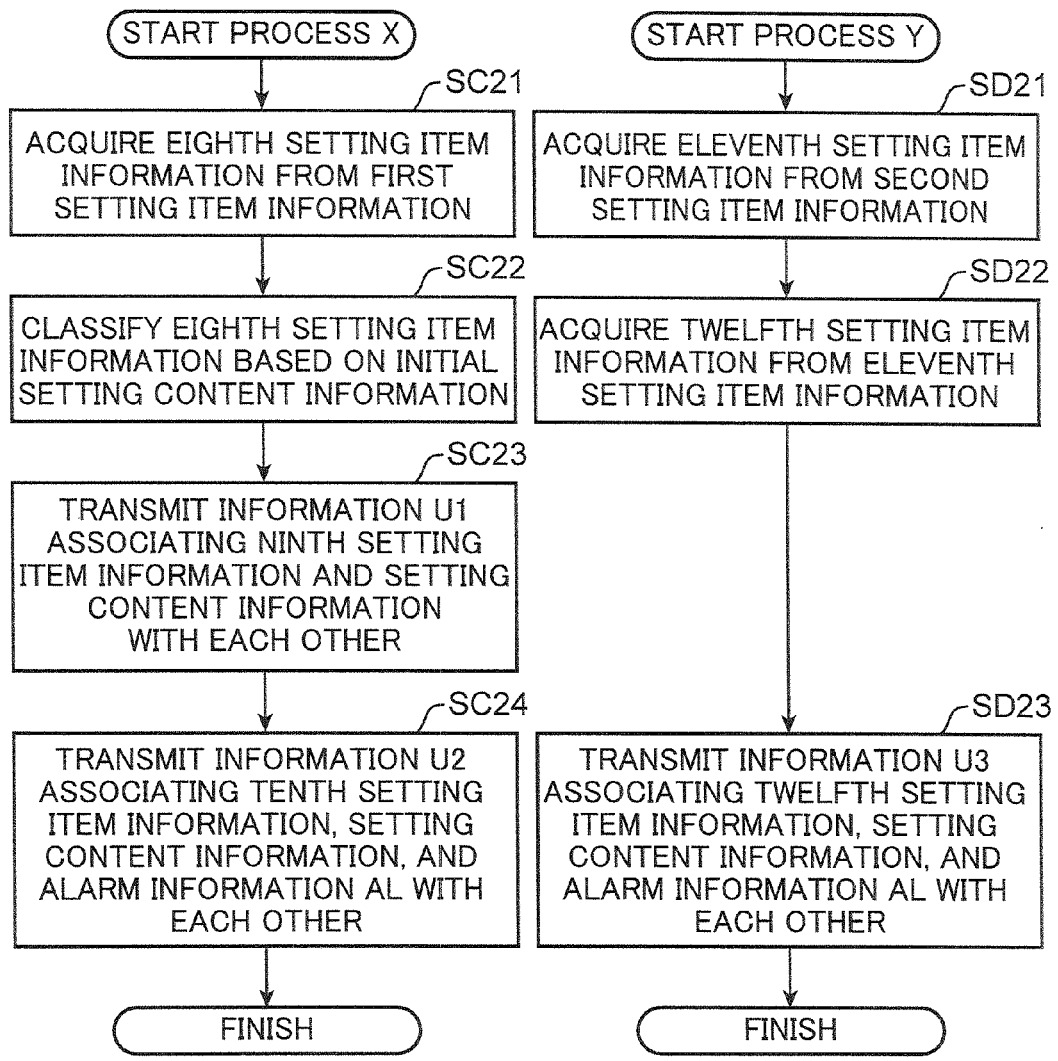
FIG. 23A is a flow chart showing a process X that is executed in an operation performed by a multifunction machine to transmit updated function setting information to a mobile terminal device.
FIG. 23B is a flow chart showing a process Y that is executed in an operation performed by a multifunction machine to transmit updated function setting information to a mobile terminal device.

FIG. 23A is a flow chart showing the process X that is executed in an operation performed by the multifunction machine 1 to transmit updated function setting information to the mobile terminal device 9, and FIG. 23B is a flow chart showing a process Y that is executed in an operation performed by the multifunction machine 1 to transmit updated function setting information to the mobile terminal device 9. Specifically, as shown in FIG. 23A, in step SB33, the updated setting information transmitting unit 21 executes the process X that is made up of steps SC21 to SC24 described below. When starting the execution of the process X, the updated setting information transmitting unit 21 first acquires eighth setting item information whose setting content information has been updated from the pieces of first setting item information J1 to J4 (SC21).

As shown in FIG. 22, for the pieces of setting item information J1 and J4 among the pieces of first setting item information J1 to J4, associated pieces of setting content information K1 and K4 have been updated. Therefore, in step SC21, the updated setting information transmitting unit 21 acquires the pieces of first setting item information J1 and J4 as the eighth setting item information.

In addition, the updated setting information transmitting unit 21 further classifies the pieces of eighth setting item information J1 and J4 acquired in step SC21 according to whether or not the pieces of setting content information K1 and K4 respectively associated with the pieces of eighth setting item information J1 and J4 are the same as the pieces of initial setting content information L1 and L4 that respectively correspond to the pieces of eighth setting item information J1 and J4 (SC22).

As shown in FIG. 22, the setting content information K1 among the pieces of setting content information K1 and K4 respectively associated with the pieces of eighth setting item information J1 and J4 is the same as the initial setting content information L1. On the other hand, the setting content information K4 associated with the setting item information J4 differs from the initial setting content information L4. Therefore, in step SC22, the updated setting information transmitting unit 21 classifies the pieces of eighth setting item information J1 and J4 into ninth setting item information J1 for which the setting content information associated with the setting item information is the same as the initial setting content information and tenth setting item information J4 for which the setting content information associated with the setting item information differs from the initial setting content information.

Next, the updated setting information transmitting unit 21 transmits information U1 which associates the ninth setting item information J1 and corresponding setting content information K1 with each other to the mobile terminal device 9 (SC23).

In addition, the updated setting information transmitting unit 21 transmits information U2 which associates the tenth setting item information J4, corresponding setting content information K4, and alarm information AL that is information representing an alarm with each other to the mobile terminal device 9 (SC24).

Meanwhile, as shown in FIG. 23B, in step SB34 (FIG. 21), the updated setting information transmitting unit 21 executes the process Y that is made up of steps SD21 to SD23 described below. When starting the execution of the process Y, the updated setting information transmitting unit 21 first acquires eleventh setting item information whose setting content information has been updated from the pieces of second setting item information J5 to J7 (SC21).

As shown in FIG. 22, for the setting item information J6 among the pieces of second setting item information J5 to J7, the setting content information K6 associated with the setting item information J6 has been updated. Therefore, in step SD21, the updated setting information transmitting unit 21 acquires the second setting item information J6 as the eleventh setting item information.

Subsequently, from the eleventh setting item information acquired in step SD21, the updated setting information transmitting unit 21 acquires twelfth setting item information for which setting content information associated with the eleventh setting item information differs from initial setting content information that corresponds to the eleventh setting item information (SD22).

As shown in FIG. 22, the setting content information K6 associated with the eleventh setting item information J6 differs from the initial setting content information L6. Therefore, in step SD22, the updated setting information transmitting unit 21 acquires the eleventh setting item information J6 as the twelfth setting item information.

In addition, the function setting information transmitting unit 21 transmits information U3 which associates the twelfth setting item information J6 acquired in step SD22, corresponding setting content information K6, and alarm information AL with each other to the mobile terminal device 9 (SD23).

As shown, the updated setting information transmitting unit 21 transmits the pieces of information U1 to U3 described above to the mobile terminal device 9 as updated setting information FU including setting content information updated by the setting information updating process and setting item information that corresponds to the setting content information.

Referring once again to FIG. 21, after executing step SB34, the disabled function setting information transmitting unit 18 executes the process C using the sixth setting item information as described above (SB5).

Specifically, as shown in FIG. 22, among the pieces of setting item information J1 to J4 and J8 to J10 representing setting items that are regarded as selection objects according to the selected item information SI, the pieces of setting item information J8 to J10 are not stored in the setting information storage unit 12. Therefore, in step SB5, the disabled function setting information transmitting unit 18 executes the process C using pieces of sixth setting item information J8 to J10 that are not stored in the setting information storage unit 12 among the pieces of setting item information J1 to J4 and J8 to J10 representing setting items that are regarded as selection objects according to the selected item information SI.

When starting the execution of the process C in step SB5, the disabled function setting information transmitting unit 18 executes step SE1 (FIG. 15C) to transmit disabled function setting information FX which associates the pieces of sixth setting item information J8 to J10 (FIG. 22) and the disabled setting information IM with each other to the mobile terminal device 9.

On the other hand, as shown in FIG. 20, let us assume that, at the mobile terminal device 9, updated setting information FU is received by the mobile-side receiving unit 94 via the radio communicating unit 92 (SA33; YES). In this case, among the setting content information displayed on the list display screen W0, the display control unit 95 replaces the setting content information associated with the same setting item information as the setting item information included in the received updated setting information FU with the setting content information included in the updated setting information FU and displays the new setting content information (SA34). Subsequently, processes of step SA5 and thereafter (FIG. 11) are performed at the mobile terminal device 9.

Figure 24:
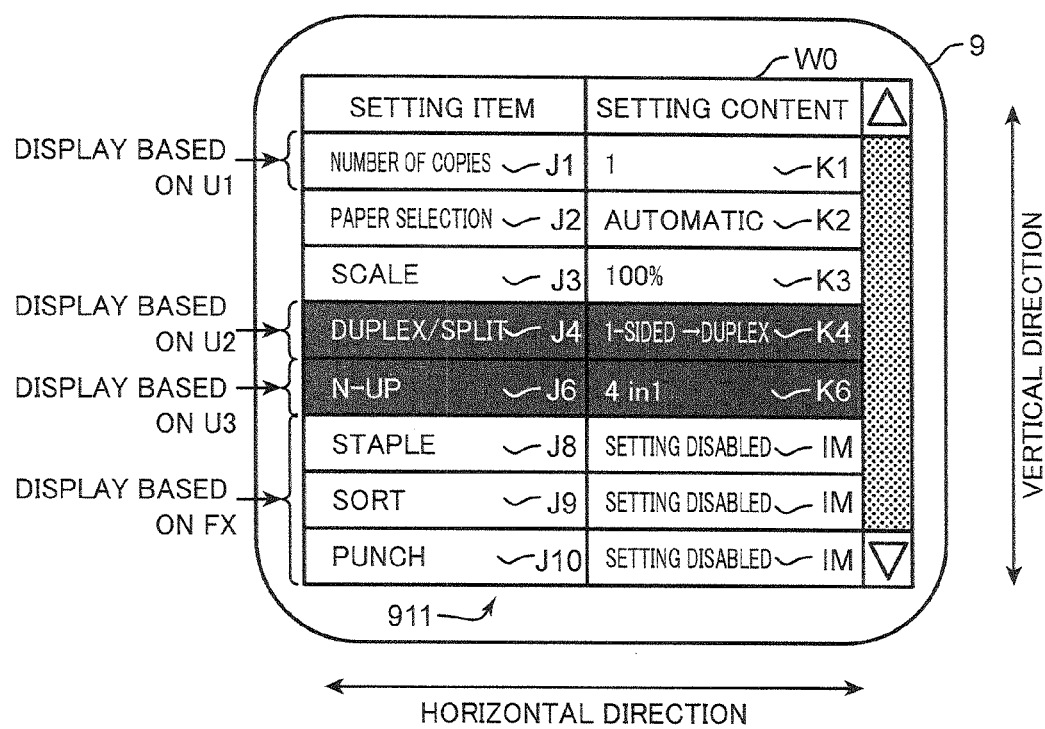
FIG. 24 is an explanatory diagram showing an example of a list display screen after an update of displayed contents.

FIG. 24 is an explanatory diagram showing an example of the list display screen W0 after an update of displayed contents. For example, let us assume that, in step SA33, the updated setting information FU shown in FIG. 22 has been received by the mobile-side receiving unit 94. In this case, as shown in FIG. 24, in step SA34, based on the information U1 included in the updated setting information FU, the display control unit 95 replaces the setting content information K1 associated with the same setting item information J1 as the setting item information J1 included in the information U1 with the setting content information K1 which is included in the information U1 and which represents the setting content "1", and displays the new setting content information K1.

In addition, based on the information U2 included in the updated setting information FU, the display control unit 95 replaces the setting content information K4 associated with the same setting item information J4 as the setting item information J4 included in the information U2 with the setting content information K4 which is included in the information U2 and which represents the setting content "1-sided→duplex", and displays the new setting content information K4. Furthermore, as shown in FIG. 22, since the alarm information AL is associated with the setting item information J4 included in the information U2 (SA5; YES), the display control unit 95 identifiably displays the setting item information J4 and the setting content information K4 that corresponds to the setting item information J4 (SA6).

In a similar manner, based on the information U3 included in the updated setting information FU, the display control unit 95 replaces the setting content information K6 associated with the same setting item information J6 as the setting item information J6 included in the information U3 with the setting content information K6 which is included in the information U3 and which represents the setting content "4 in 1", and displays the new setting content information K6. In addition, as shown in FIG. 22, since the alarm information AL is associated with the setting item information J6 included in the information U3 (SA5; YES), the display control unit 95 identifiably displays the setting item information J6 and the setting content information K6 that corresponds to the setting item information J6 (SA6).

Furthermore, let us assume that disabled function setting information FX has been received by the mobile-side receiving unit 94 via the radio communicating unit 92 (SA7; YES). In this case, based on the disabled function setting information FX received by the mobile-side receiving unit 94, the display control unit 95 further associates setting item information included in the disabled function setting information FX and disabled setting information IM associated with the setting item information included in the disabled function setting information FX with each other, and displays the associated information on the list display screen W0 (SA8).

Specifically, let us assume that, in step SA7, the disabled function setting information FX shown in FIG. 22 is received by the mobile-side receiving unit 94. In this case, as shown in FIG. 24, in step SA8, the display control unit 95 associates pieces of setting item information J8 to J10 included in the disabled function setting information FX and disabled setting information IM associated with the pieces of setting item information J8 to J10 with each other, and displays the associated information on the list display screen W0.

According to the embodiment, updated setting information FU including setting content information newly stored in the setting information storage unit 12 and setting item information that corresponds to the setting content information is transmitted to the mobile terminal device 9. In addition, among the setting content information displayed on the list display screen W0, the display control unit 95 replaces setting content information associated with the same setting item information as the setting item information included in the updated setting information FU with the setting content information included in the updated setting information FU and displays the new setting content information.

Therefore, the amount of information transmitted to the mobile terminal device 9 can be reduced to the amount of information in the newly stored setting content information and the setting item information that corresponds to the setting content information. Accordingly, the time required for displaying the list display screen W0 can be reduced to the time required to update display of a part of the pieces of setting content information displayed on the list display screen W0. As a result, when setting content information that corresponds to any of the setting items is updated at the multifunction machine 1, the setting content information updated at the multifunction machine 1 can be promptly reflected on the list display screen W0.

Moreover, a configuration may be adopted in which step SB3 (FIG. 13) is executed in place of step SB33 (FIG. 21) and SB4 (FIG. 13) is executed in place of step SB34 (FIG. 21). Correspondingly, the mobile terminal device 9 may be configured so that, after executing step SA32 (FIG. 20), the mobile terminal device 9 executes processes of step SA3 (FIG. 11) and thereafter without executing steps SA33 and SA34.

In other words, the updated setting information transmitting unit 21 may be configured to be operated in a similar manner to when the liquid crystal display 911 initially displays the list display screen W0. Specifically, the updated setting information transmitting unit 21 may be configured to transmit second function setting information F2 which not only includes setting content information newly stored in the setting information storage unit 12 and setting item information that corresponds to the setting content information as described above but also includes function setting information that corresponds to first setting item information and second setting item information whose setting content information has not been updated. Correspondingly, the mobile terminal device 9 may be configured so as to newly display the list display screen W0 based on the received second function setting information F2.

Hereinafter, an operation for changing a display order of combinations of setting item information and setting content information that corresponds to the setting item information which are displayed on the list display screen W0 will be described. In addition, details of the display order change accepting unit 98 and the display order change control unit 99 will be given in the description.

Figure 25B:
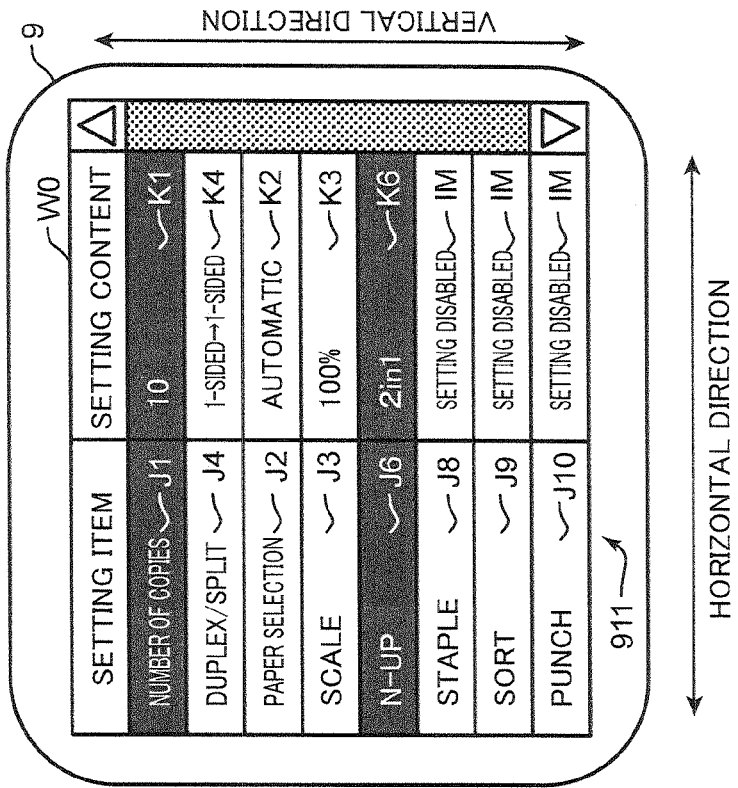
FIG. 25B is a diagram showing a list display screen after changing the display order.
Figure 25A:
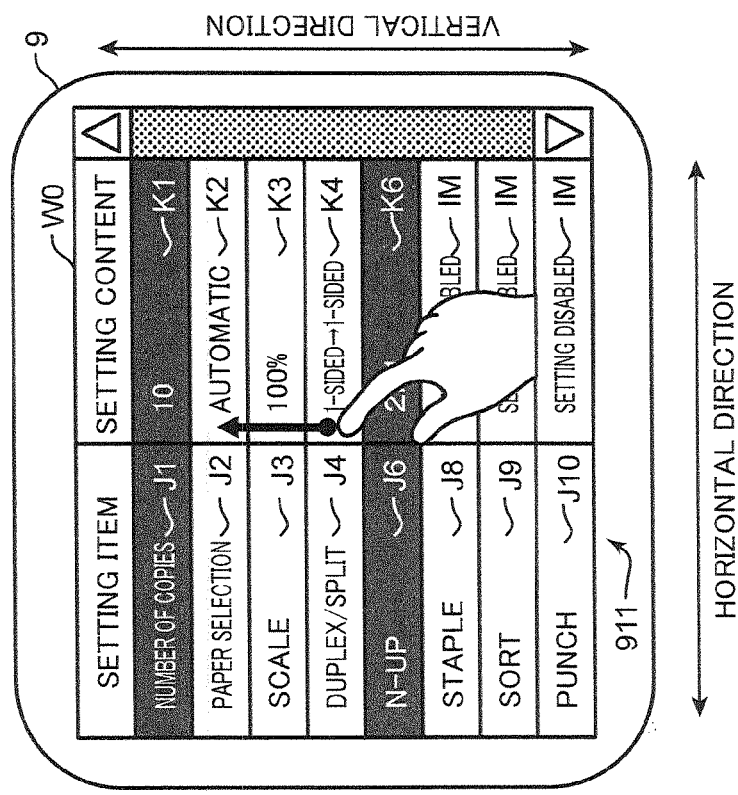
FIG. 25A is a diagram showing a list display screen before changing a display order of combinations of setting item information and setting content information that corresponds to the setting item information which are displayed on the list display screen.

FIG. 25A is a diagram showing the list display screen W0 before changing a display order of combinations of setting item information and setting content information that corresponds to the setting item information which are displayed on the list display screen W0, and FIG. 25B is a diagram showing the list display screen W0 after changing the display order.

For example, let us assume that a swiping operation has been performed in a vertical direction on any of the combinations of setting item information and setting content information that corresponds to the setting item information which are displayed on the list display screen W0. In this case, the display order change accepting unit 98 determines that a change operation has been performed with respect to a display order of the combination of setting item information and setting content information that corresponds to the setting item information on which the swiping operation had been performed. At this point, the display order change accepting unit 98 accepts an instruction to display the combination on which the swiping operation had been performed to a position at which the liquid crystal display 911 had been touched at the end of the swiping operation.

For example, FIG. 25A shows that the user performs a swiping operation in the vertical direction on the combination of the setting item information J4 and the setting content information K4 to a position where the combination of the setting item information J2 and the setting content information K2 is being displayed.

In this case, the display order change accepting unit 98 determines that a change operation has been performed with respect to a display order of the combination of the setting item information J4 and the setting content information K4. At this point, the display order change accepting unit 98 accepts an instruction to display the combination of the setting item information J4 and the setting content information K4 at the position where the combination of the setting item information J2 and the setting content information K2 is being displayed.

Moreover, a change operation with respect to a display order of a combination of setting item information and setting content information is not limited to a swiping operation. For example, the change operation may be a plurality of operations such as a touching operation performed on a combination that is an object of display order change, followed by a touching operation of a combination presently displayed at a destination of the display position of the combination that is an object of display order change in order to select the destination position.

Based on the instruction for changing the display order which is accepted by the display order change accepting unit 98, the display order change control unit 99 changes the display order of the combinations of setting item information and setting content information displayed on the list display screen W0.

For example, as shown in FIG. 25A, let us assume that an instruction to display the combination of the setting item information J4 and the setting content information K4 at the position where the combination of the setting item information J2 and the setting content information K2 is being displayed has been accepted by the display order change accepting unit 98. In this case, as shown in FIG. 25B, the display order change control unit 99 displays the combination of the setting item information J4 and the setting content information K4 at the position where the combination of the setting item information J2 and the setting content information K2 had been displayed. In addition, correspondingly, the display order change control unit 99 shifts respective display positions of the combination of the setting item information J2 and the setting content information K2 and a combination of the setting item information J3 and the setting content information K3 downward in the vertical direction and displays these combinations at the shifted positions.

According to the embodiment, for example, the user can perform a change operation of the display order of combinations of setting item information and setting content information associated with the setting item information to an order in which confirmation work on the setting content information is to be performed. Accordingly, the user can display setting item information and setting content information associated with the setting item information in a desired display order. As a result, convenience of confirmation work on setting content information is improved.

Moreover, configurations and the like shown in FIGS. 1 to 25 simply exemplify an embodiment according to the present disclosure and are not intended to limit the present disclosure to the embodiment.

For example, selected item information SI unique to each user can be stored in the selected item storage unit 15 in association with user identification information for identifying the user. Correspondingly, an operation screen for performing input operations of user identification information for identifying users may be provided on the mobile terminal device 9. In addition, when requesting the multifunction machine 1 to transmit function setting information in step SA2 (FIG. 11) and step SA32 (FIG. 20), the mobile-side receiving unit 94 may transmit the inputted user identification information. In this case, at the multifunction machine 1, the user identification is received together with the transmission request for function setting information in step SB1 (FIG. 13) and step SB31 (FIG. 21). Correspondingly, in step SB2 (FIGS. 13 and 21), the setting item selecting unit 16 may use the selected item information SI associated with the received user identification information that is stored in the selected item storage unit 15.

In addition, when transmitting hidden setting item information to the multifunction machine 1 in step SA22 (FIG. 18A), the hidden setting item transmitting unit 97 may transmit the inputted user identification information. In this case, at the multifunction machine 1, in step SB21 (FIG. 18B), the user identification information is received together with the hidden setting item information. Correspondingly, in step SB22 (FIG. 18B), the selected item excluding unit 20 may exclude setting item information represented by the received hidden setting item information from the setting item information that is regarded as a selection object according to the selected item information SI associated with the received user identification information.

Furthermore, the mobile-side control unit 90 may be simplified so as not to function as the display order change accepting unit 98 and the display order change control unit 99.

In addition, the selected item storage unit 15 respectively included in the multifunction machines 1a to 1c may store selected item information SI whose content differs from that of the selected item information SI stored in a different multifunction machine 1.

Furthermore, the function setting control system SYS may be configured so as to include only one multifunction machine 1. Correspondingly, the mobile-side control unit 90 may be simplified so as not to function as the communication object accepting unit 93, and the communication object multifunction machine 1 of the radio communicating unit 92 may be fixed to the one multifunction machine 1.

In addition, simplification may be implemented so that the alarm information AL is not transmitted to the mobile terminal device 9 in association with setting item information for which setting content information differs from initial setting content information in step SC3 (FIG. 15A), step SD2 (FIG. 15B), step SC24 (FIG. 23A), and step SD23 (FIG. 23B). Correspondingly, the mobile terminal device 9 may be simplified so as not to execute step SA5 and SA6 (FIG. 11).

Furthermore, simplification may be implemented so that the control unit 10 does not function as the disabled function setting information transmitting unit 18 and step SB5 (FIGS. 13 and 21) is not executed. Correspondingly, the mobile terminal device 9 may be simplified so as not to execute step SA7 and SA8 (FIG. 11).

In addition, the mobile-side control unit 90 may be configured so as not to function as the hidden object accepting unit 96 and the hidden setting item transmitting unit 97. Correspondingly, the control unit 10 may be simplified so as not to function as the hidden setting item receiving unit 19 and the selected item excluding unit 20.

Furthermore, the control unit 10 may be configured so as not to use a part of the storage area of the non-volatile memory as the selected item storage unit 15 and may be simplified so as not to function as the setting item selecting unit 16. Correspondingly, in place of the processes of steps SB2 to SB5 (FIG. 13), the function setting information transmitting unit 17 may transmit second function setting information F2 including all the pieces of setting item information included in the first function setting information F1 stored in the setting information storage unit 12 and all of the pieces of setting content information to the mobile terminal device 9.

Moreover, in the embodiment, an example in which an image forming apparatus according to the present disclosure is applied to the multifunction machine 1 has been described. The present disclosure can also be applied to an image forming apparatus such as a copier, a scanner, a facsimile apparatus, and the like.

According to the present disclosure described above, in a function setting control system which includes an image forming apparatus and a mobile terminal device capable of communicating with the image forming apparatus, setting contents that correspond to a plurality of setting items for controlling functions can be readily confirmed by a user.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A function setting control system including an image forming apparatus and a mobile terminal device capable of communicating with the image forming apparatus,
    the image forming apparatus, including:
    a control unit which controls functions by using a plurality of setting items;
    a setting information storage unit which respectively associates a plurality of pieces of setting item information respectively representing the plurality of setting items and a plurality of pieces of setting content information representing setting contents that respectively correspond to the plurality of setting items with each other, and which stores the associated information as first function setting information;
    a function setting information transmitting unit which executes a function setting information transmission process in which second function setting information including at least a part of the pieces of setting item information among the plurality of pieces of setting item information included in the first function setting information and the setting content information corresponding to the at least part of the pieces of setting item information is transmitted to the mobile terminal device, and the mobile terminal device, including:
a mobile-side display unit which displays information;
a mobile-side receiving unit which receives information transmitted from the image forming apparatus; and
a display control unit which performs a list display process of causing the mobile-side display unit to display a list display screen on which, based on the second function setting information received by the mobile-side receiving unit, setting item information included in the second function setting information and the setting content information associated with the setting item information included in the second function setting information are associated with each other and displayed on one screen, wherein
the image forming apparatus further includes:
a selected item storage unit that stores selected item information representing a setting item selected in advance as a setting item to be displayed on the list display screen among the plurality of pieces of setting item information;
an initial setting information storage unit that stores a plurality of pieces of initial setting content information determined in advance as initial values of setting contents that correspond respectively to the plurality of setting items; and
a setting item selecting unit that classifies the plurality of pieces of setting item information into pieces of first setting item information that are included in the selected item information and pieces of second setting item information that are not included in the selected item information, wherein,
in the function setting information transmitting unit, the second function setting information is made to contain the pieces of first setting item information and pieces of changed setting item information, the pieces of changed setting item information being the setting item information having the setting content information that differs from the initial setting content information, among the pieces of second setting item information;
the mobile terminal device further includes:
a hidden object accepting unit which accepts an input operation for the setting item information that is an object to be hidden among the setting item information that is displayed on the list display screen; and
a hidden setting item transmitting unit which transmits to the image forming apparatus the setting item information accepted by the hidden object accepting unit as hidden setting item information, and
the image forming apparatus further includes:
a hidden setting item receiving unit which receives the hidden setting item information from the hidden setting item transmitting unit; and
a selected item excluding unit which excludes the setting item information represented by the hidden setting item information received by the hidden setting item receiving unit from the pieces of setting item information that are regarded as objects to be selected as setting items to be displayed on the list display screen according to the selected item information.

2. The function setting control system according to claim 1, wherein
the image forming apparatus further includes:
a disabled function setting information transmitting unit which, when pieces of setting item information that are regarded as objects to be selected as setting items to be displayed on the list display screen according to the selected item information include setting-disabled setting item information that differs from the setting item information included in the first function setting information, transmits disabled function setting information created as a result of associating the setting-disabled setting item information and disabled setting information representing that a setting item represented by the setting-disabled setting item information does not exist with each other to the mobile terminal device, wherein
based on the disabled function setting information received by the mobile-side receiving unit, the display control unit further associates the setting item information included in the disabled function setting information and the disabled setting information associated with the setting item information included in the disabled function setting information with each other and displays the associated information on the list display screen.

3. The function setting control system according to claim 1, wherein
in the function setting information transmission process, when the setting item information included in the second function setting information includes the changed setting item information, the function setting information transmitting unit further transmits alarm information that is information representing an alarm in association with the changed setting item information to the mobile terminal device, and
the display control unit identifiably displays at least one of the pieces of setting item information associated with the alarm information and pieces of setting content information that correspond to the pieces of setting item information in the list display process.

4. The function setting control system according to claim 1, wherein
the image forming apparatus is provided in plurality,
the selected item storage units of the respective image forming apparatuses store the same selected item information, and
the mobile terminal device further includes:
a communication object accepting unit which accepts an operation for alternatively selecting any one of the image forming apparatuses as a communication object among the plurality of image forming apparatuses.

5. The function setting control system according to claim 1, wherein
the image forming apparatus further includes:
an input accepting unit which accepts an input operation of the setting content information corresponding to any setting item among the plurality of setting items, and
a setting information updating unit which performs a setting information updating process in which the setting content information corresponding to the any setting item accepted by the input accepting unit is stored in the setting information storage unit as new setting content information associated with setting item information representing the any setting item stored in the setting information storage unit.

6. The function setting control system according to claim 5, wherein
the image forming apparatus further includes:
an updated setting information transmitting unit which transmits updated setting information including the setting content information newly stored in the setting information updating process and the setting item information that corresponds to the setting content information to the mobile terminal device, wherein
when the updated setting information is received by the mobile-side receiving unit, the display control unit further replaces the setting content information associated with the same setting item information as the setting item information included in the updated setting information among the setting content information displayed on the list display screen with the setting content information included in the updated setting information and displays the setting content information after the replacement.

7. The function setting control system according to claim 1, wherein the mobile terminal device further includes:
a display order change accepting unit which accepts a change operation of a display order of combinations of the setting item information and the setting content information associated with the setting item information which are displayed on the list display screen; and
a display order change control unit which changes a display order of the combinations displayed on the list display screen based on the display order accepted by the display order change accepting unit.

8. An image forming apparatus capable of communicating with a mobile terminal device, the image forming apparatus comprising:
a control unit which controls functions by using a plurality of setting items;
a setting information storage unit which respectively associates a plurality of pieces of setting item information respectively representing the plurality of setting items and a plurality of pieces of setting content information representing setting contents that respectively correspond to the plurality of setting items with each other and stores the associated information as first function setting information;
a function setting information transmitting unit which executes a function setting information transmission process in which second function setting information representing at least a part of the pieces of setting item information among the plurality of pieces of setting item information included in the first function setting information and the setting content information corresponding to the at least part of the pieces of setting item information is transmitted to the mobile terminal device;
a selected item storage unit that stores selected item information representing a setting item selected in advance as a setting item to be displayed on the list display screen displayed in the mobile terminal device among the plurality of pieces of setting item information;
an initial setting information storage unit that stores a plurality of pieces of initial setting content information determined in advance as initial values of setting contents that correspond respectively to the plurality of setting items; and
a setting item selecting unit that classifies the plurality of pieces of setting item information into pieces of first setting item information that are included in the selected item information and pieces of second setting item information that are not included in the selected item information, wherein,
in the function setting information transmitting unit, the second function setting information is made to contain the pieces of first setting item information and pieces of changed setting item information, the pieces of changed setting item information being the setting item information having the setting content information that differs from the initial setting content information, among the pieces of second setting item information, the image forming apparatus further includes:
a hidden setting item receiving unit that receives the hidden setting item information, which is an object to be hidden among the setting item information that is displayed on the list display screen, from the mobile terminal device; and
a selected item excluding unit that excludes the setting item information represented by the hidden setting item information received by the hidden setting item receiving unit from the pieces of setting item information that are regarded as objects to be selected as setting items to be displayed on the list display screen according to the selected item information.

9. A function setting control system including an image forming apparatus and a mobile terminal device capable of communicating with the image forming apparatus, the image forming apparatus, including:
a control unit that controls functions by using a plurality of setting items;
a setting information storage unit that respectively associates a plurality of pieces of setting item information respectively representing the plurality of setting items and a plurality of pieces of setting content information representing setting contents that respectively correspond to the plurality of setting items with each other, and which stores the associated information as first function setting information;
a function setting information transmitting unit that executes a function setting information transmission process in which second function setting information including at least a part of the pieces of setting item information among the plurality of pieces of setting item information included in the first function setting information and the setting content information corresponding to the at least part of the pieces of setting item information is transmitted to the mobile terminal device, and
the mobile terminal device, including:
a mobile-side display unit that displays information;
a mobile-side receiving unit that receives information transmitted from the image forming apparatus; and
a display control unit that performs a list display process of causing the mobile-side display unit to display a list display screen on which, based on the second function setting information received by the mobile-side receiving unit, setting item information included in the second function setting information and the setting content information associated with the setting item information included in the second function setting information are associated with each other and displayed on one screen
the image forming apparatus further includes:
a selected item storage unit that stores selected item information representing a setting item selected in advance as a setting item to be displayed on the list display screen among the plurality of pieces of setting item information; and
a setting item selecting unit that, based on the selected item information, selects at least one of the plurality of pieces of setting item information as the at least part of the pieces of setting item information
the mobile terminal device further includes:
a hidden object accepting unit that accepts an input operation for the setting item information that is an object to be hidden among the setting item information that is displayed on the list display screen; and
a hidden setting item transmitting unit that transmits to the image forming apparatus the setting item information accepted by the hidden object accepting unit as hidden setting item information, and the image forming apparatus further includes:

a hidden setting item receiving unit that receives the hidden setting item information from the hidden setting item transmitting unit; and a selected item excluding unit that excludes the setting item information represented by the hidden setting item information received by the hidden setting item receiving unit from the pieces of setting item information that are regarded as objects to be selected as setting items to be displayed on the list display screen according to the selected item information.

* * * * *